(12) United States Patent
Stenning et al.

(10) Patent No.: US 12,469,519 B2
(45) Date of Patent: Nov. 11, 2025

(54) MAGNETIC MEDIA

(71) Applicant: Imperial College Innovations Limited, London (GB)

(72) Inventors: Kilian James Darrie Stenning, London (GB); Xiaofei Xiao, London (GB); Holly Holder, London (GB); Jack Carter Gartside, London (GB); Rupert Francis Maximillian Oulton, London (GB); William Richard Branford, London (GB)

(73) Assignee: Imperial College Innovations Limited, London (GB)

( * ) Notice: Subject to any disclaimer, the term of this patent is extended or adjusted under 35 U.S.C. 154(b) by 0 days.

(21) Appl. No.: 18/714,732

(22) PCT Filed: Nov. 30, 2022

(86) PCT No.: PCT/GB2022/053032
§ 371 (c)(1),
(2) Date: May 30, 2024

(87) PCT Pub. No.: WO2023/099887
PCT Pub. Date: Jun. 8, 2023

(65) Prior Publication Data
US 2025/0029633 A1  Jan. 23, 2025

(30) Foreign Application Priority Data
Nov. 30, 2021 (GB) ..................................... 2117279

(51) Int. Cl.
*G11B 11/105* (2006.01)
(52) U.S. Cl.
CPC .. *G11B 11/10506* (2013.01); *G11B 11/10582* (2013.01); *G11B 2220/2516* (2013.01)

(58) Field of Classification Search
None
See application file for complete search history.

(56) References Cited

U.S. PATENT DOCUMENTS 3,651,262 A * 3/1972 Korpel ...................... G02F 1/09
                                                                 360/110
5,176,943 A * 1/1993 Woo .......................... C08K 5/42
(Continued)

FOREIGN PATENT DOCUMENTS

| DE | 105344 A1 | 4/1974 |
| JP | H06203410 A | 7/1994 |
| WO | 2013095139 A2 | 6/2013 |

OTHER PUBLICATIONS

M. Savoini et al: "Highly efficient all-optical switching of magnetization in GdFeCo microstructures by interference-enhanced absorption of light", Physical Review B, vol. 86, Jan. 1, 2012 (Jan. 1, 2012), p. 140404, XP093011316.
(Continued)

*Primary Examiner* — Peter Vincent Agustin
(74) *Attorney, Agent, or Firm* — NK Patent Law

(57) ABSTRACT

A magnetic medium is described which includes a thin film magnet structure formed of a ferromagnetic alloy or compound. The thin film magnet structure includes one or more ferromagnetic domains and is coupled to one or more optical structures. Each of the one or more ferromagnetic domains have a magnetization that is switchable between two or more states. Each of the one or more optical structures is configured to increase absorbance of light at a target wavelength in the thin film magnet structure, such that in response to illumination of a ferromagnetic domain with continuous-wave light including the target wavelength, that ferromagnetic domain undergoes all-optical magnetic switching.

18 Claims, 21 Drawing Sheets

(56) References Cited

U.S. PATENT DOCUMENTS

| | | | |
|---|---|---|---|
| 5,357,493 A | | 10/1994 | Okazaki |
| 5,400,316 A | * | 3/1995 | Igarashi ................ B29C 45/263 |
| 6,055,215 A | * | 4/2000 | Katsuragawa ......... G11B 5/855 |
| 6,377,414 B1 | * | 4/2002 | Wang ..................... G11B 5/743 |
| 10,037,777 B1 | * | 7/2018 | Stupakiewicz ........ G11B 5/676 |
| 2002/0048106 A1 | * | 4/2002 | Miyata ..................... G11B 5/82 |
| 2004/0197604 A1 | * | 10/2004 | Furuya ............. G11B 11/10536 |
| | | | 369/13.01 |
| 2006/0122058 A1 | * | 6/2006 | Van Brocklin .......... B41M 5/36 |
| 2007/0230047 A1 | * | 10/2007 | Jin ......................... G11B 5/314 |
| 2011/0199867 A1 | * | 8/2011 | Stipe ...................... G11B 5/314 |
| 2022/0372272 A1 | * | 11/2022 | Zhao ..................... F03G 7/0616 |

OTHER PUBLICATIONS

UKIPO, Combined Search and Examination Report for corresponding United Kingdom Patent Application No. GB2117279.6, dated May 30, 2022, 8 pages.

ISA/EP, International Search Report and Written Opinion for corresponding PCT Patent Application No. PCT/GB2022/053032, mailed Feb. 28, 2023, 14 pages.

* cited by examiner

Densely-packed nanomagnets a) ASI vertex types

Type 1  Type 2  Type 3  Type 4

Energy → b)

4 μm

ŷ, x̂ Incident laser polarisation

← m (unchanged)   ⇒ m (written)

MAGNETIC MEDIA

CROSS REFERENCE TO RELATED APPLICATIONS

This application is a U.S. National Stage Application of International Patent Application No. PCT/GB2022/053032, filed on Nov. 30, 2022, which claims priority to United Kingdom Patent Application No. 2117279.6, filed on Nov. 30, 2021, the entire contents of all of which are incorporated by reference herein.

FIELD

The present invention relates to magnetic media, systems including the magnetic media, and methods of writing information to the magnetic media.

BACKGROUND

Low-power local magnetisation control is considered important to present and future information processing and data-storage technologies. Reference is made to: A. V. Kimel and M. Li, Nat. Rev. Mater. 4, 189 (2019); C.-H. Lambert et al., Science 345, 1337 (2014); S. Mangin et al., Nat. Mater. 13, 286 (2014); and C. D. Stanciu et al., Phys. Rev. Lett. 99, 047601 (2007). Developing next-generation low-power magnetic switching may help to offset the accelerating energy demands of IT.

All-optical magnetic switching has been demonstrated in several schemes, all with distinct caveats precluding practical technological implementation. Helicity-dependent switching with single or multiple femtosecond laser pulses has been observed in ferrimagnetic, ferromagnetic and granular magnetic media where the resulting state is determined by the helicity of light. Reference is made to: C.-H. Lambert et al., Science 345, 1337 (2014); M. S. El Hadri et al., Phys. Rev. B 94, 064412 (2016); R. Medapalli et al., Phys. Rev. B 96, 224421 (2017); and M. O. Ellis, E. E. Fullerton, and R. W. Chantrell, Sci. Rep. 6, 1 (2016).

Helicity-independent switching has been demonstrated with a single femtosecond pulse, yet has been reported to be largely limited to ferrimagnets containing rare-earth metals and multi-domain antiferromagnetic materials. Reference is made to: C. D. Stanciu et al., Phys. Rev. Lett. 99, 047601 (2007); M. S. El Hadri et al., Phys. Rev. B 94, 064412 (2016); T. Ostler et al., Nat. Commun. 3, 1 (2012); C. Stanciu et al., Phys. Rev. Lett. 99, 217204 (2007); I. Radu et al., Nature 472, 205 (2011); M. S. El Hadri et al., J. Phys. D: Appl. Phys. 50, 133002 (2017); L. Le Guyader et al., Appl. Phys. Lett. 101, 022410 (2012); and K. Olejník et al., Sci. Adv.4, eaar3566 (2018).

Helicity-independent switching in ferromagnets has typically been reported when coupling to ferrimagnetic layers, bar a demonstration of helicity-independent switching in Pt/Co/Pt multilayers when focussing the spot size down to the intrinsic domain size. Reference is made to: J. Gorchon et al., Appl. Phys. Lett. 111, 042401 (2017); S. Iihama et al., Adv. Mater. 30, 1804004 (2018); J. Igarashi et al., Nano Lett. 20, 8654 (2020); and M. Vomir, M. Albrecht, and J.-Y. Bigot, Appl. Phys. Lett. 111, 242404 (2017).

These demonstrations have shown the promise of all-optical switching, but the requirement of huge femtosecond-pulsed MW lasers and exotic magnetic materials renders them unsuitable for widespread device integration. Additionally, the majority of previous studies concern continuous thin films or single nanostructures with large spacings, restricting write-density, see for example: L. Le Guyader et al., Appl. Phys. Lett. 101, 022410 (2012). All-optical magnetic switching promises tightly spatially-localised magnetisation control in the absence of power-consuming and poorly spatially-confined electromagnets. However, the limitations of femtosecond lasers and/or usage of rare earth elements currently outweigh any possible gains from removing the need to apply external magnetic fields.

Artificial spin systems comprising networks of strongly-interacting nanomagnets have been reported as promising hosts for future information-processing technologies including nanomagnetic logic, neuromorphic computation and reconfigurable magnonics. Information can be stored in a magnetisation of a single nanomagnet or the magnetic configuration of the entire network (microstate) whilst long-range dipolar interactions between neighbouring elements give rise to collective microstate dependent dynamics which has been suggested may be harnessed to process information. Reference is made to: K. Y. Camsari et al., Phys. Rev. X 7, 031014 (2017); F. Caravelli and C. Nisoli New J. Phys. 22, 103052 (2020); G. Tanaka et al., Neural Netw. 115, 100 (2019); D. Marković, et al., Nat. Rev. Phys. 2, 499 (2020); S. Lendinez and M. Jungfleisch, J. Phys. Condens. Matter 32, 013001 (2019); A. Chumak, A. Serga, and B. Hillebrands, J. Phys. D: Appl. Phys. 50, 244001 (2017); A. Barman et al., J. Appl. Phys. 128, 170901 (2020); M. T. Kaffash, S. Lendinez, and M. B. Jungfleisch, Phys. Lett. A 402, 127364 (2021); and J. C. Gartside et al., Nat. Commun. 12, 1 (2021).

Artificial spin ice (ASI) is one such system, comprising nanoislands arranged in a geometrically frustrated manner, resulting in a vastly degenerate microstate space. Strong inter-element coupling gives rise to distinct microstate dynamics and computational functionality. Reference is made to: S. Lendinez and M. Jungfleisch, J. Phys. Condens. Matter 32, 013001 (2019); R. Wang et al., Nature 439, 303 (2006); S. H. Skjærvø et al., Nat. Rev. Phys. 2, 13 (2020); J. H Jensen, E. Folven, and G. Tufte, in *Artificial Life Conference Proceedings*, 15-22 (MIT Press, 2018); J. H. Jensen and G. Tufte, in *Artificial Life Conference Proceedings*, 376-383 (MIT Press, 2020); K. Hon et al., Appl. Phys. Express 14, 033001 (2021); and J. C. Gartside et al. arXiv preprint arXiv: 2107.08941 (2021).

Local nanomagnet switching reported to date in ASI relies on slow scanning probe techniques or diffraction limited laser-induced heat-assisted reversal relying on global magnetic fields in conjunction with laser illumination. Reference is made to: Y.-L. Wang et al., Science 352, 962 (2016); J. C. Gartside et al., Sci. Rep. 6, 32864 (2016); J. C. Gartside et al., Nat. Nanotechnol. 13, 53 (2018); K. D. Stenning et al. ACS Nano 15, 674 (2020); E. Albisetti et al., Nat. Nanotechnol. 11, 545 (2016); and M. Pancaldi, N. Leo, and P. Vavassori, Nanoscale 11, 7656 (2019).

SUMMARY

According to a first aspect of the invention there is provided a magnetic medium including a thin film magnet structure formed of a ferromagnetic alloy or compound. The thin film magnet structure includes one or more ferromagnetic domains and is coupled to one or more optical structures. Each of the one or more ferromagnetic domains has a magnetization that is switchable between two or more states. Each of the one or more optical structures is configured to increase absorbance of light at a target wavelength in the thin film magnet structure, such that in response to illumination of a ferromagnetic domain with continuous-wave light including the target wavelength, that ferromagnetic domain undergoes all-optical magnetic switching.

The thin film magnet structure may form a part of one, some, or all, of the optical structures. For example, the thin film magnet structure may provide a reflector of one or more of the optical structures. Each optical structure may be coupled to a portion or region of the thin film magnet structure, so as to increase absorbance of light at the target wavelength in that portion or region.

The one or more optical structures may include an anti-reflective optical structure configured for the target wavelength.

The optical structure may include a reflective surface and a dielectric layer interposed between the reflective surface and the magnet structure. The dielectric layer may be substantially transparent at the target wavelength. Substantially transparent may correspond to a transmission of 50% or more, 60% or more, 70% or more, 80% or more or 90% or more of incident light at the target wavelength through the thickness of the dielectric layer.

The one or more optical structures may be configured to increase absorbance of light in the thin film magnet structure at a target wavelength by acting as a Fabry-Pérot cavity.

The magnetic medium may be configured such that the all-optical magnetic switching is responsive to continuous-wave light having a power density greater than or equal to 0.1 MW/cm$^2$, greater than or equal to 0.35 MW/cm$^2$, or greater than or equal to 1 MW/cm$^2$.

The magnetic medium may be configured such that the all-optical magnetic switching of ferromagnetic domains is responsive to continuous-wave light which is polarised. The continuous-wave light may be linearly polarised. The continuous-wave light may be circularly polarised. The continuous-wave light may be elliptically polarised.

The magnetization state into which a given ferromagnetic domain is switched may depend upon the polarisation of the light.

The magnetic medium may be configured such that in response to scanning light over the magnet structure, the magnetizations of chains of ferromagnetic domains undergo switching. The magnetic medium may be configured such that in response to rastering light over the magnet structure, the magnetizations of ferromagnetic domains in the area over which light is rastered undergo switching.

The magnetic medium may be configured such that all-optical magnetic switching occurs in response to illumination which is pulsed or modulated.

The magnetic medium may be configured such that all-optical magnetic switching occurs in response to illumination using a source of illumination including, or taking the form of, a laser. The laser may take the form of a laser diode, or a diode-pumped solid-state laser.

The all-optical magnetic switching of a ferromagnetic domain in response to illumination with continuous-wave light does not correspond to a femtosecond laser pulse.

The thin film magnet structure may be coupled to a single optical structure. The thin film magnet structure may be coupled to two or more optical structures.

An optical structure of the one or more optical structures may be configured to increase absorbance of the light in the thin film magnet structure at the target wavelength, and also to increase absorbance of the light in the thin film magnet structure at a second target wavelength different to the target wavelength. A first ferromagnetic domain of the thin film magnet structure may undergo all-optical magnetic switching in response to illumination with continuous-wave light including the target wavelength. A second ferromagnetic domain of the thin film magnet structure may undergo all-optical magnetic switching in response to illumination with continuous-wave light including the second target wavelength.

The target wavelength may not be an integer multiple or an integer divisor of the second wavelength. The target wavelength may not be a harmonic of the second target wavelength. The second target wavelength may not be a harmonic of the target wavelength. The target wavelength may be between 100 nm and 1500 nm. The target wavelength may be between 200 nm and 700 nm. The target wavelength may be 405±20 nm, 532±20 nm, 633±20 nm, 650±20 nm, 780 nm±20 nm, or 810±20 nm.

The magnetic medium may include one or more second optical structures. At least a portion of the thin film magnet structure may be coupled to each of the second optical structures. Each of the one or more second optical structures may be configured to increase absorbance of light in the thin film magnet structure at a second target wavelength which is different to the target wavelength. A first ferromagnetic domain of the thin film magnet structure may undergo all-optical magnetic switching in response to illumination with continuous-wave light including the target wavelength. A second ferromagnetic domain of the thin film magnet structure may undergo all-optical magnetic switching in response to illumination with continuous-wave light including the second target wavelength.

A second optical structure may have any relationship to the thin film magnet structure which has been described hereinbefore in relation to the optical structure(s). A second optical structure may include features corresponding to any features described hereinbefore in relation to the optical structure(s). Any definitions applicable to the optical structure(s) may be equally applicable to the second optical structure(s).

The target wavelength may not be an integer multiple or an integer divisor of the second target wavelength. The target wavelength may not be a harmonic of the second target wavelength. The second target wavelength may not be a harmonic of the target wavelength.

The thin film magnet structure may include, or take the form of, one or more nanomagnets. Each nanomagnet may provide a respective ferromagnetic domain. Each nanomagnet may provide a single ferromagnetic domain. Each nanomagnet may be coupled to (or form part of) a corresponding optical structure and/or second optical structure. Two or more (or all) of the nanomagnets may be coupled to (or form part of) a single optical structure and/or a single second optical structure.

The nanomagnets may be arranged in an array. The array may be a square array. The array may be a rectangular array. The array may be a triangular array. The array may be according to any one of the five 2D Bravais lattices, with a motif including one or more nanomagnets. The nanomagnets may be arranged along a path. The path may include, or take the form of, a spiral. The path may include, or take the form of, a serpentine path. The nanomagnets may be disordered.

The nanomagnets may be arranged to form an artificial spin ice geometry. The nanomagnets may be arranged to form a square artificial spin ice geometry. The nanomagnets may be arranged in an artificial spin ice geometry according to any one of the five 2D Bravais lattices, with a motif including one or more nanomagnets.

One, some, or all of the nanomagnets may be bar shaped. One, some, or all of the nanomagnets may be T-shaped. One, some, or all of the nanomagnets may be X-shaped. The shape of each nanomagnet may be square, triangular, circular, elliptical, stadium shaped, or oval. All of the nanomagnets may have the same shape. The nanomagnets may each have one of two or more shapes. When the nanomagnets each have one of two or more shapes, the two or more shapes may be arranged in a repeating pattern.

The thin film magnet structure may include, or take the form of, a mesh. The mesh may be a square mesh. The mesh may be a rectangular mesh. The mesh may be a triangular mesh. The mesh may be a disordered mesh. The mesh may take the form of a union of first magnetic elements extending in a first direction and second magnetic elements extending in a second, different, direction.

The ferromagnetic alloy or compound includes two or more elements. Herein the term "alloy" refers to a substance including two or more elements and exhibiting metallic binding. Herein, the term "compound" refers to a substance including two or more elements and exhibiting covalent bonding.

One or more of the elements included in the ferromagnetic alloy or compound may be transition metal elements. For example, the ferromagnetic alloy or compound may take the form of an alloy comprising nickel (Ni) and iron (Fe). For example, the ferromagnetic alloy or compound may be $Ni_{81}Fe_{19}$ or $Ni_{50}Fe_{50}$.

The ferromagnetic alloy or compound may include no rare earth elements. A ferromagnetic alloy or compound includes no rare earth elements if no rare earth elements are intentionally added, doped, and so forth to that alloy or compound. In other words, the ferromagnetic alloy or compound may include no rare earth elements beyond background or trace quantities. Herein, rare earth elements refer to elements in the lanthanide series (elements with an atomic number between 57 and 71 inclusive, i.e., lanthanum through lutetium).

The ferromagnetic alloy or compound may have a magnetic anisotropy that is sufficiently low that the available magnetization states in a given structure are determined primarily by shape anisotropy, as opposed to another type of magnetic anisotropy such as magnetocrystalline anisotropy. The ferromagnetic alloy or compound may take the form of materials with low magnetic anisotropy ($K_1 < 500$ kJ/m$^3$). This is not limited to nickel-iron alloys such as Permalloy, and may also include, for example, a ferromagnetic alloy or compound including cobalt and iron, such as cobalt iron alloy (CoFe) or cobalt iron boride (CoFeB).

The ferromagnetic alloy or compound may have a magnetic anisotropy ($K_1 > 500$ kJ/m$^3$) that is sufficiently high that the available magnetization states in a given structure are determined primarily by magnetocrystalline anisotropy, as opposed to shape anisotropy. The ferromagnetic alloy or compound may take the form of alloys including cobalt and platinum (CoPt), alloys including iron and palladium (FePd), and/or lanthanide alloys (such as NdFeB).

The thin film magnet structure may include one or more nanowires formed from the ferromagnetic alloy or compound. The ferromagnetic alloy or compound may take the form of compounds including chromium and oxygen. The ferromagnetic alloy or compound may take the form of chromium dioxide.

The magnetic medium may be shaped to form a disc. The magnetic medium may be supported on a substrate. The magnetic medium may form part of a hard disc. The magnetic medium may form part of an optical disc.

The magnet structure may include a first subset of the one or more ferromagnetic domains having a magnetization oriented substantially parallel to a first direction.

The magnet structure may include a second subset of the one or more ferromagnetic domains having a magnetization oriented substantially parallel to a second direction different from the first direction.

Substantially parallel may mean oriented within ±20 degrees on average, preferably oriented within ±10 degrees on average, or more preferably oriented within ±5 degrees on average. The first and second directions may make an angle between (including endpoints) 45° and 90°. The first and second directions may be perpendicular.

A system may include the magnetic medium and a source of continuous-wave light. The source of continuous-wave light may encompass the target wavelength. In other words, the light emitted by the source of continuous-wave light includes a sufficient power density of light at (and around) the target wavelength to trigger switching of the magnetizations of ferromagnetic domains of the magnet structure. The system may be configured to use the source of continuous-wave light to write information to the magnetic medium using all-optical magnetic switching of one or more ferromagnetic domains of the magnet structure.

The source of continuous-wave light may be configured to apply a power density greater than or equal to 0.1 MW/cm$^2$, greater than or equal to 0.35 MW/cm$^2$, or greater than or equal to 1 MW/cm$^2$ to ferromagnetic domains of the magnetic medium.

The source of continuous-wave light may be configured to emit polarised light. The source of continuous-wave light may be linearly polarised. The source of continuous-wave light may be circularly polarised. The source of continuous-wave light may be elliptically polarised.

The system may be configured to scan a light beam from the source of continuous-wave light over the magnet structure, such that the magnetizations of chains of ferromagnetic domains scanned by the light beam are switched in response. The system may be configured to raster the light beam from the source of continuous-wave light over the magnet structure, such that the magnetizations of ferromagnetic domains in the area over which the light beam is rastered are switched in response.

The magnet structure may include a first subset of the one or more ferromagnetic domains having a magnetization oriented substantially parallel to a first direction. The system may be configured to switch one or more ferromagnetic domains belonging to the first subset by scanning light from the source of continuous-wave light in a direction substantially parallel to the first direction.

The system does not need to switch all the first subset at once, and indeed, this is not preferable. The first subset may be subdivided into two or more regions, or "bits", for the purposes of switching using the source of continuous-wave light.

The magnet structure may include a second subset of the one or more ferromagnetic domains having a magnetization oriented substantially parallel to a second direction different to the first direction, and the system may be configured to switch one or more ferromagnetic domains belonging to the second subset by scanning light from the source of continuous-wave light in a direction substantially parallel to the second direction.

The system does not need to switch all the second subset at once, and indeed, this is not preferable. The second subset may be subdivided into two or more regions, or "bits", for the purposes of switching using the source of continuous-wave light.

The system may be configured to pulse or modulate illumination provided by the source of continuous-wave light.

The timescale on which the illumination is pulsed or modulated may be greater than or equal to 1.23 MHz (corresponding to the 1× writing speed of CD media), greater than or equal to 11 MHz (corresponding to the 1× writing speed of DVD media), or greater than or equal to 36 MHz (corresponding to the 1× writing speed of HD DVD media or Blu-ray media). The timescale on which the illumination is pulsed or modulated may correspond to a multiple of the 1.23 MHZ, 11 MHz or 36 MHz, for example 2×, 4×, 8×, 16×, etc. The timescale on which the illumination is pulsed or modulated may be greater than or equal to 7 GHz (corresponding to the writing speed of HAMR HDD technology).

The magnetic medium may include, or take the form of, a disc. The magnet structure may include, or take the form of, nanomagnets arranged along a path. The path may be a spiral path. The path may be a serpentine path, for example corresponding to a path to be traced by a rastered light beam.

The system may be configured for optical readout of the magnetic medium. The system may include one or more optical readout units. Each of the one or more optical readout units may include, or take the form of, an analyser polarising filter and a detector for detecting the intensity of light as a function of polarisation angle. The optical readout of the magnetic medium may be based on the Magneto-Optical Kerr Effect.

The system may be configured to readout information stored on the magnetic medium using a magnetic readout mechanism. The magnetic readout mechanism may include a magnetic read head sensor.

According to a second aspect of the invention there is provided a system configured to receive the magnetic medium according to the first aspect. The second includes a source of continuous-wave light encompassing the target wavelength. The system is configured to use the source of continuous-wave light to write information to the magnetic medium using all-optical magnetic switching of one or more ferromagnetic domains of the magnet structure.

The system according to the second aspect may include features corresponding to any features of the magnetic medium according to the first aspect and/or the system including that magnetic medium.

According to a third aspect of the invention there is provided a method of writing information to a magnetic medium. The magnetic medium includes a thin film magnet structure formed of a ferromagnetic alloy or compound. The thin film magnet structure includes one or more ferromagnetic domains and is coupled to one or more optical structures. Each of the one or more ferromagnetic domains has a magnetization that is switchable between two or more states. Each of the one or more optical structures is configured to increase absorbance of light at a target wavelength in the thin film magnet structure. The method includes illuminating a ferromagnetic domain with continuous-wave light including the target wavelength to cause that ferromagnetic domain to undergo all-optical magnetic switching.

The method may include reading a magnetization state of at least one ferromagnetic domain of the magnetic medium using the magneto-optic Kerr effect.

The magnet structure may include a first subset of the one or more ferromagnetic domains having a magnetization oriented substantially parallel to a first direction, and illuminating the ferromagnetic domain may include switching one or more ferromagnetic domains belonging to the first subset by scanning the continuous-wave light in a direction substantially parallel to the first direction.

The magnet structure may include a second subset of the one or more ferromagnetic domains having a magnetization oriented substantially parallel to a second direction different to the first direction, and illuminating the ferromagnetic domain further comprises switching one or more ferromagnetic domains belonging to the second subset by scanning the continuous-wave light in a direction substantially parallel to the second direction.

Substantially parallel may mean oriented within ±20 degrees on average, preferably oriented within ±10 degrees on average, or more preferably oriented within ±5 degrees on average. The first and second directions may make an angle between (including endpoints) 45° and 90°. The first and second directions may be perpendicular.

The method may include features corresponding to any features of the magnetic medium according to the first aspect, the system including that magnetic medium and/or the system according to the second aspect. Definitions applicable to the magnetic medium, or a system incorporating the magnetic medium (or features of either) may be equally applicable to the method (or features thereof).

BRIEF DESCRIPTION OF THE DRAWINGS

Certain embodiments of the present invention will now be described, by way of example, with reference to the accompanying drawings, in which.

DETAILED DESCRIPTION

Figure 1:
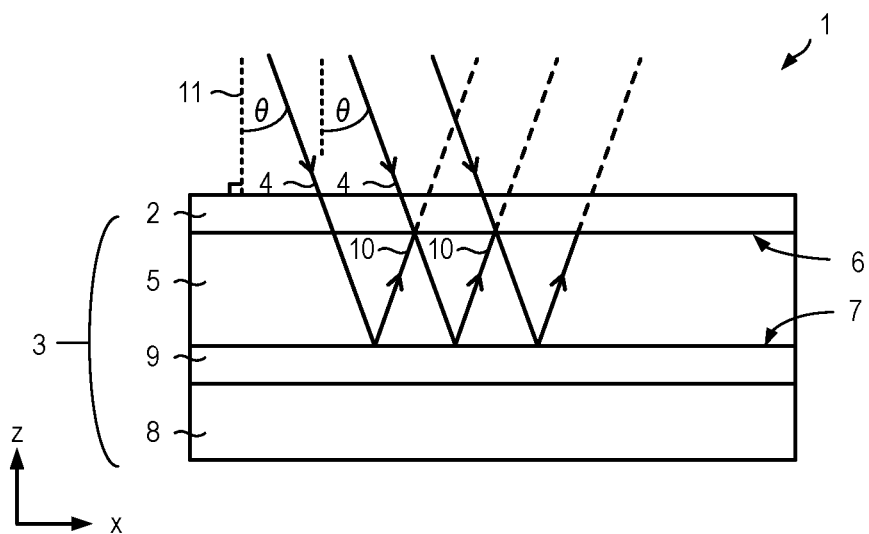
FIG. 1 is a side view of a magnetic medium.

In the following, like parts are denoted by like reference numerals.

Realising rapid low-power single-element magnetic switching is important for the development of functional storage and computational devices. All-optical magnetic switching represents a potential next-generation class of local magnetisation control, with potential applications across a host of data storage and processing technologies. However, as discussed in the background, previously reported all-optical switching schemes require high intensity femtosecond laser pulses and magnetic media containing scarce and expensive materials.

The present specification is concerned with selective and deterministic all-optical magnetic switching of individual, separated and/or densely packed ferromagnetic nanostructures using a low-power continuous-wave (CW) laser and with no requirement to apply an external magnetic field. The present specification describes methods and structure for achieving sub-diffraction limit, single nanomagnet switching of diverse artificial spin-ice microstates including unfavourable high-energy configurations. The materials employed are relatively cheap and earth-abundant, and switching functionality is expected to be retained across a broad range of substrate and ferromagnetic materials enabling the technique to be scalable and readily integrated with existing technologies. The low-power consumption and cheap cost of non-specialised CW lasers may enable use across a host of device technologies including data storage and non-conventional computing functionalities, for example neuromorphic and memcomputing hardware.

Referring to FIG. 1, a side view of a portion of a magnetic medium 1 is shown.

The magnetic medium includes a thin film magnet structure 2 formed of a ferromagnetic alloy or compound. The thin film magnet structure 2 includes one or more ferromagnetic domains (not shown). Each ferromagnetic domain has a magnetization (not shown) that is switchable between two or more states (the precise number depending on the material, shape and so forth). The thin film magnet structure 2 is coupled to one or more optical structures 3.

Each optical structure 3 is configured to increase absorbance of light at a target wavelength in the thin film magnet structure 2. Surprisingly, the inventors have discovered that illuminating one of the ferromagnetic domains of the magnetic medium 1 with continuous-wave light 4 including the target wavelength causes that ferromagnetic domain to undergo all-optical magnetic switching.

An example of a suitable optical structure is an anti-reflective optical structure configured for the target wavelength, as shown in FIG. 1. In this example, the optical structure 3 takes the form of a dielectric layer 5 having an upper surface 6 and a lower surface 7, the dielectric layer 5 interposed between the magnet structure 2 and a substrate 8 having a reflective portion 9. The reflective portion 9 may be a discrete sub-layer supported on the bulk of the substrate 8, for example a thin metal layer formed from example gold or another reflective metal. Alternatively, the reflective portion may be an integral portion of the substrate 8 (formed from, for example, silicon), for example a polished region of the substrate 9.

The dielectric layer 5 is substantially transparent at the target wavelength, and has a thickness such that light 10 reflected from the lower surface 7 interferes destructively with incident light 4 and light reflected from the upper surface 6 back towards the lower surface 7 (the number of multiple reflections is believed to be low). Without wishing to be bound by theory, it is believed that the suppression of both reflection and transmission causes the observed increase in absorbance in the magnet structure (see FIG. 9B).

The transmission of the lower surface 7 may be less than 50%. Optionally, one or more additional layers (not shown) may be provided between the substrate 8 and the dielectric layer 5. When included, the optional additional layer(s) may improve the reflectivity of the lower surface 7. For example, additional layers (not shown) may be deposited to provide a Bragg reflector. The lower surface 7 is preferably as reflective as possible in practice, for example, reflecting 50% or more.

In alternative implementations (not shown), if the dielectric layer 5 has sufficient mechanical strength (for example to support its own weight and the weight of the magnet structure 2), the substrate 8 may be omitted and the lower surface 7 may be made reflective by deposition of additional layer(s) (not shown) in the form of a metallic layer, a Bragg reflector structure, and so forth.

Figure 2:
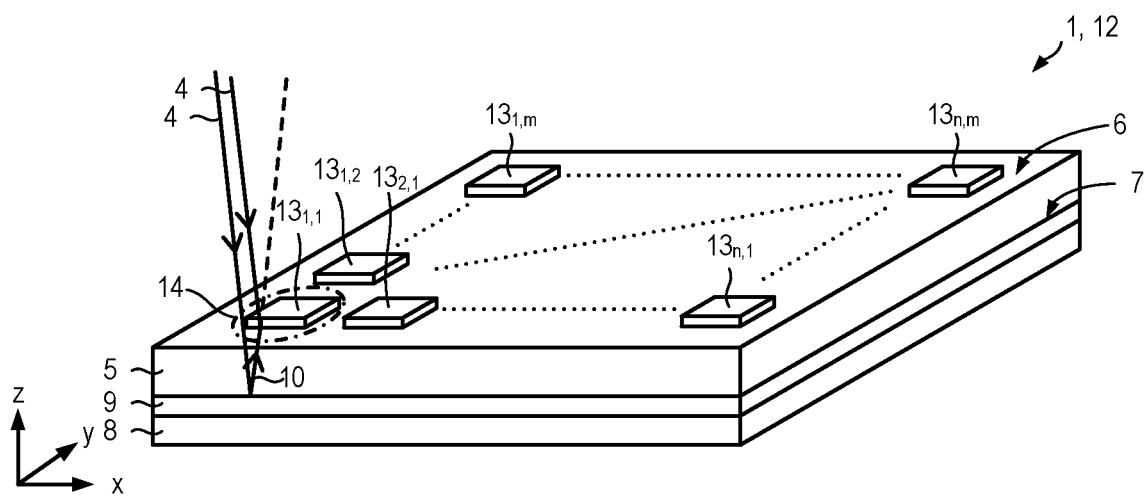
FIG. 2 is a perspective view of a first example of a magnetic medium.

The magnetic medium 1 is structured so that when illuminated with incident light 4 that includes light having the target wavelength, the magnet structure 2 at least partly transmits the incident light 4 through to the dielectric layer 5. For example, the magnet structure 2 may have a thickness which permits a portion of the incident light 4 to be transmitted to the dielectric layer 5 through the magnet structure 2 (for example, by evanescent propagation). In other examples, the magnet structure 2 may take the form of multiple nanomagnets (see FIGS. 2 and 9) patterned on a scale smaller than the diffraction limit of the light 4 used for illumination, such that a layer (or array in some examples) of the nanomagnets acts as a partial reflector. In other examples, the magnet structure 2 takes the form of multiple nanomagnets 16 (FIG. 2) patterned on a scale larger than the diffraction limit of the light 4 used for illumination, with interference occurring around the periphery of each nanomagnet 16 (FIG. 2)

The focussed beam of illuminating light 4 may be introduced such that a central angle of the illuminating light 4 is substantially perpendicular to the surface normal 11 of the magnetic medium (though of course there may be some difference in illumination angle across the light spot 14). The magnetic medium 1 may be configured to respond to illuminating light having an angle θ between the direction of propagation of the incident light 4 and the surface normal 11 that is less than 20°, less than 10°, less than 5°, or less than 1°. In effect, the angle of incidence should not be so large that the path length through the dielectric layer 5 will no longer lead to destructive interference at, and around, the target wavelength. The target wavelength may be between 100 nm and 1500 nm. Preferably, the target wavelength is selected to correspond to readily available semiconductor lasers already used in DVD laser sources, Blu-ray® laser sources, HAMR, and/or MiniDisk (650±20 nm, 405±20 nm, 810±20 nm, and 780 nm±20 nm respectively), or GaAs lasers (around 720 nm to around 850 nm).

The thin film magnet structure 2 may form a part of one, some, or all, of the optical structures 3. For example, the upper surface 6 of the dielectric layer 5, on which the magnet structure 2 is disposed, may provide a reflector of one or more of the optical structures 2. The thin film magnet structure 2 may be coupled to a single optical structure 3. Alternatively, the thin film magnet 2 structure may be coupled to two or more optical structures 3. Each optical structure 3 may be coupled to a portion or region of the thin film magnet structure 2, so as to increase absorbance of light at the target wavelength in that portion or region.

The size of the ferromagnetic domains may be limited by geometric factors, such as the spatial extent of the part of the magnet structure 2 that includes the ferromagnetic domain.

In some implementations, the optical structure 3 may increase absorbance of light 4 in the thin film magnet structure 2 at a target wavelength by acting as a Fabry-Pérot cavity, significantly enhancing optical absorption in the magnet structure 2 across a broad spectrum. In the anti-reflection interference design shown in FIG. 1, without wishing to be bound by theory, it is believed that the origin of the observed increase in absorption is minimising the reflections and transmission. The optical structure 3 may, for example, include $Si/SiO_2$ or $Au/SiO_2$ and surrounding air.

The dielectric layer 5 may have a thickness corresponding to one-quarter of the target wavelength.

The ferromagnetic alloy or compound includes two or more elements. One or more of the elements may be transition metal elements. For example, the ferromagnetic alloy or compound may take the form of an alloy comprising nickel (Ni) and iron (Fe). For example, the ferromagnetic alloy or compound may be permalloy (Py) having a composition about $Ni_{81}Fe_{19}$ (for example 80±5% nickel with the balance iron). Other alloys in the nickel-iron system may also be used such as, for example, $Ni_{50}Fe_{50}$. Without wishing to be bound by theory, it is believed that the multi-element nature of the ferromagnetic alloy or compound alloy may play a role in the switching mechanism of ferromagnetic domains of magnetic media 1 described herein.

The ferromagnetic alloy or compound preferably includes no rare earth elements (i.e., no intentionally included rare earth elements, there will often be trace quantities). Rare earth elements include elements in the lanthanide series (elements with an atomic number between 57 and 71 inclusive, i.e., lanthanum through lutetium).

In some examples, the ferromagnetic alloy or compound may have low magnetic anisotropy and the available magnetization states in a given structure may be determined primarily by shape anisotropy, as opposed to another type of magnetic anisotropy such as magnetocrystalline anisotropy. For example, see FIG. 15. Ferromagnetic alloys in the nickel-iron system often have suitable low magnetic anisotropy, for example Permalloy. However, low magnetic anisotropy is not limited to nickel-iron alloys, and the ferromagnetic alloy or compound may take the form of other (i.e. not nickel-iron) materials having low magnetic anisotropy, for example, an alloy including cobalt and iron, such as cobalt iron alloy (CoFe) or cobalt iron boride (CoFeB).

In other implementations, the ferromagnetic alloy or compound may have substantial magnetic anisotropy, for example such that shape anisotropy does not dominate. For example, the ferromagnetic alloy or compound may take the form of alloys including cobalt and platinum (CoPt), alloys including iron and palladium (FePd), and lanthanide alloys (such as NdFeB).

Without wishing to be bound by theory, it is currently believed that the power density for causing all-optical magnetic switching of the magnetic medium 1 should be of the order of 0.1 $MW/cm^2$ or greater, for example in the region of 0.35 $MW/cm^2$. There is no practical upper bound on the power density beyond the requirements not to degrade the material or to excessively heat the magnetic medium.

The magnetic medium 1 may be configured such that the all-optical magnetic switching is responsive to continuous-wave light which is polarised. The continuous-wave light 4 may be linearly polarised. Alternatively, the continuous-wave light 4 may be circularly polarised or elliptically polarised. The magnetization state into which a given magnetization is switched may be related to the polarisation of the light.

The source of illumination may be a laser. For example, the laser may be a laser diode, or a diode-pumped solid-state laser. However, the illumination of a ferromagnetic domain with a continuous-wave light does not correspond to a femtosecond laser pulse.

Referring also to FIG. 2, a perspective view of a first exemplary implementation 12 of the magnetic medium 1 is shown (hereinafter the "first magnetic medium").

The first magnetic medium 12 includes a magnet structure 2 patterned into a number of nanomagnets 13 arranged into an array on the upper surface 6 of the dielectric layer 5, for example, N rows by M columns. Let the nanomagnet 13 in the $n^{th}$ row and $m^{th}$ column be denoted $13_{n,m}$. Each nanomagnet defines at least one respective ferromagnetic domain having a magnetization that is switchable between two or more states. Illumination is provided in an area defined by light spot 14, which in use is controlled to scan, raster etc across the nanomagnets $13_{n,m}$. Depending on the size and/or spacing of the nanomagnets $13_{n,m}$, the light spot 14 may illuminate a single nanomagnet $13_{n,m}$ at a time, or a group of nanomagnets $13_{n,m}$ may be illuminated concurrently by the light spot 14 (e.g., a nanomagnet $13_{n,m}$ and one of more nearest neighbours $13_{n\pm1,m\pm1}$).

The nanomagnets 13 in the first magnetic medium 12 are shown arranged in a square array. However, in alternative implementations the nanomagnets 13 may be arranged in a differently shaped array. For example, the nanomagnets 13 may be arranged in an artificial spin ice geometry according to any one of the five 2D Bravais lattices, with a motif including one or more nanomagnets 13.

In alternative implementations, the nanomagnets 13 may be arranged spaced apart along a path, for example a spiral or serpentine path. In still other implementations, the nanomagnets 13 may be disordered (for example, only short range order, or a spin glass-like configuration).

The nanomagnets 13 in the first magnetic medium 12 are shown as square shaped. However, a square shape is not essential and in alternative implementations one, some, or all of the nanomagnets 13 may have other shapes. For example, one, some, or all of the nanomagnets 13 may be stadium shaped (rectangular with rounded corners), bar shaped, triangular, circular, elliptical, oval, and so forth.

The first magnetic medium 12 is configured such that in response to scanning light 4 over the magnet structure 2 to sweep across a chain/sequence of the nanomagnets 2, the magnetizations of the corresponding ferromagnetic domains undergo switching. The pattern of movement of the light spot 14 is not essential, and the light spot 14 may be rastered or scanned in any way, though preferably along a continuous path for efficiency. In a practical implementation for data storage, the light spot 14 may be moved relative to the magnetic medium 1 and/or the magnetic medium 1 may be moved relative to the light sport 14. As discussed hereinafter in relation to FIGS. 20A to 20E, the relative orientation of the direction of scanning the light spot and the direction along which magnetisations are aligned can influence switching fidelity.

The first magnetic medium 12 may be configured such that the all-optical magnetic switching of ferromagnetic domains is responsive to illumination which is pulsed or modulated. For example, the light spot 14 may be swept along a row of nanomagnets $13_{n,1}$, $13_{n,2}$, ..., $13_{n,m}$, ..., $13_{n,M}$, and the intensity of the light 4 may be synchronised to be high when passing across nanomagnets $13_{n,m}$ which are to be switched and low when passing across nanomagnets $13_{n,m}$ which are to be left unchanged.

A timescale on which the light is pulsed or modulated may be around 1.23 MHz (corresponding to the 1× writing speed of CD media), around 11 MHz (corresponding to the 1× writing speed of DVD media), or around 36 MHz (corresponding to the 1× writing speed of HD DVD media or Blu-ray media). The timescale on which the illumination is pulsed or modulated may be around or less than an integer divisor of the above, i.e., 2×, 4×, 8×, 16×, etc.

Figure 3:
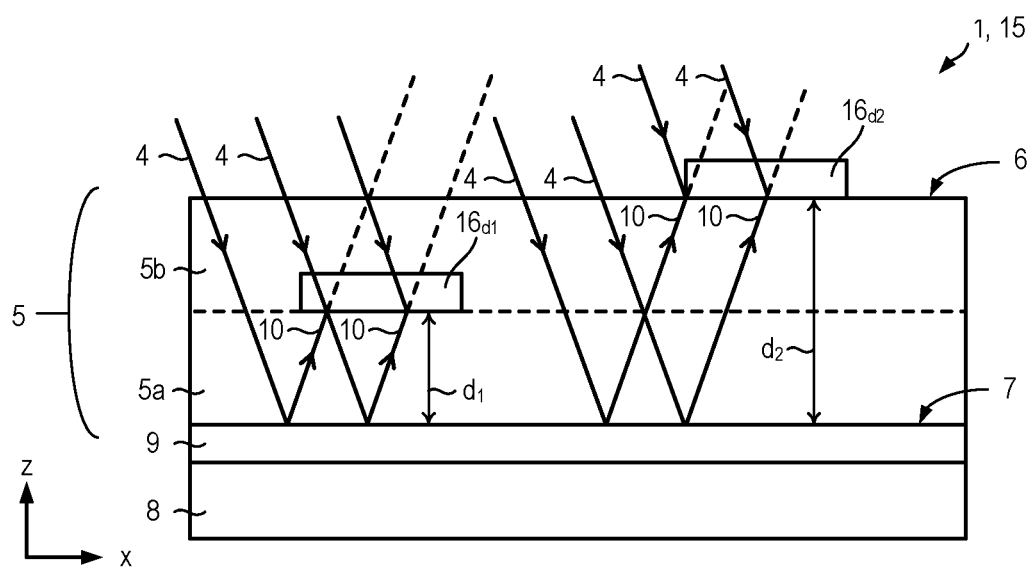
FIG. 3 is a side view of a second example of a magnetic medium.

Referring to FIG. 3, a schematic cross section of a second exemplary implementation of the magnetic medium 1 is shown (hereinafter "second magnetic medium").

The magnet structure of the second magnetic medium 15 includes at least first and second nanomagnets $16_{d1}$, $16_{d2}$ (in general, there will be many of each type). The first nanomagnets $16_{d1}$ are embedded in the dielectric layer 5 and arranged at a distance $d_1$ from the lower surface 7, whilst the second nanomagnets $16_{d2}$ are disposed on the upper surface 6 of the dielectric layer 5 at a distance $d_2$ from the lower surface 7 equal to the thickness of the dielectric layer 5.

For example, the dielectric layer 5 may be formed as two sub-layers/in two steps. A lower portion 5a may be deposited over the substrate 9 to a thickness $d_1$, followed by formation of the first nanomagnets $16_{d1}$. An upper portion 5b may then be deposited to a total thickness of $d_2$ (i.e. the upper portion has thickness $d_2-d_1$) before formation of the second nanomagnets $16_{d2}$. If the thickness $d_2-d_1$ of the upper portion 5b is not sufficient for planarization of the upper surface 6, then the upper portion 5b may be deposited to a greater thickness and then polished back to the desired total thickness $d_2$ of the dielectric layer 5.

The first and second nanomagnets $16_{d1}$, $16_{d2}$ may be arranged in arrays in the same way as the first magnetic medium 12. For example, the first and second nanomagnets 16da, 16d2 may be arranged in (laterally) interpenetrating square arrays.

In this example, the optical structures 3 are configured to increase absorbance of light in the first nanomagnets $16_{d1}$, at the target wavelength (i.e., a 'first' target wavelength) and to increase absorbance of light in the second nanomagnets $16_{d2}$ at a second target wavelength. A first ferromagnetic domain of the first nanomagnet $16_{d1}$ will undergo all-optical magnetic switching in response to illumination with continuous-wave light 4 including the target wavelength (and not including light at the second target wavelength), whilst the light 4 at the target wavelength does not sufficiently couple to the second nanomagnets $16_{d2}$. Similarly, a second ferromagnetic domain of a second nanomagnet $16_{d2}$ undergoes all-optical magnetic switching in response to illumination with continuous-wave light 4 including the second target wavelength (and not including light at the second target wavelength). Thus, an optical structure 3 configured for more than one target wavelength may be provided. Using the selective responses of the first and second nanomagnets $16_{d1}$, $16_{d2}$ in combination with a pair of light sources tuned to the first and second target wavelengths, the density of nanomagnets $16_{d1}$, $16_{d2}$ may be increased whilst retaining the capacity to switch a single nano-magnet. In other words, whilst the size of the light spot 14 is diffraction limited, if centred on a particular first nanomagnet $16_{d1}$, light at the target wavelength may be used for switching, without disturbing nearest neighbours in the form of second nanomagnets $16_{d2}$.

The target wavelength should not be an integer multiple or an integer divisor of the second wavelength (or vice versa), in order to provide the desired selectivity.

In alternative magnetic media 1 (not specifically shown), instead of using nanomagnets embedded at different locations in the same optical structure 3, the second magnetic medium 15 may additionally or alternatively also include one or more second optical structures 3. For example, the surface of the substrate 8 may be patterned into two (or more) different heights prior to deposition of the dielectric layer 5. An example may include a checkerboard pattern of high and low height. After deposition of a planarizing dielectric layer 5, first nanomagnets $16_{d1}$ may be formed of the high regions, whilst second nanomagnets $16_{d2}$ are co-planar with the first nanomagnets, but formed over the thicker portions of the dielectric layer 5 corresponding to low regions.

At least a portion of the thin film magnet structure 2 may be coupled to each of the second optical structures (not shown). Each of the one or more second optical structures (not shown) should configured to increase absorbance of light in the thin film magnet structure 2 at the second target wavelength.

The possible relationships of the magnet structure 2 to the second optical structure(s) (not shown) are the same as those previously described in relation to the optical structures 3.

Figure 4:
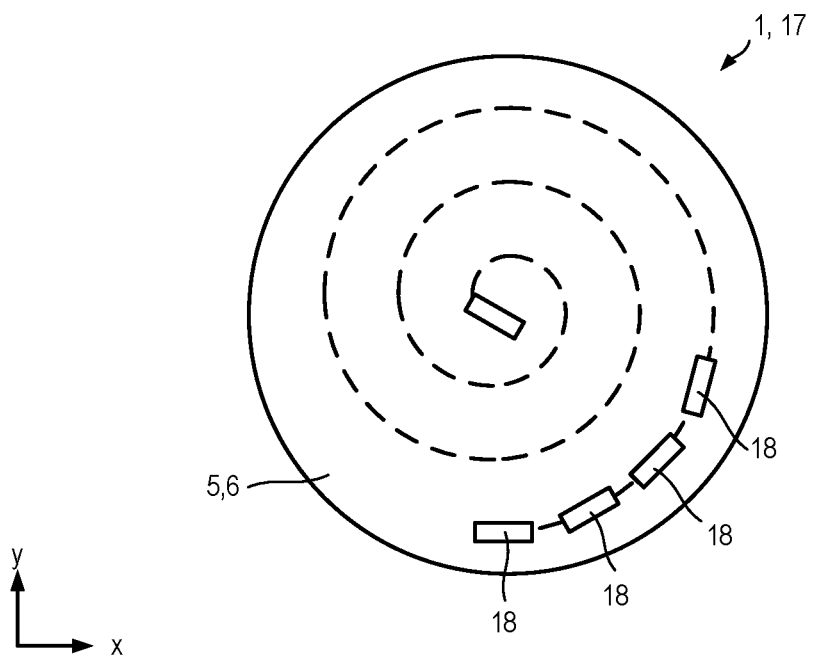
FIG. 4 is a plan view of a third example of a magnetic medium.

Referring also to FIG. 4, a plan view of a third implementation 17 of the magnetic medium 1 is shown (hereinafter the "third magnetic medium").

The substrate 8 of the third magnetic medium 17 is shaped to form a disc which supports and arrangement of nanomagnets 18 spaced along a spiral path. The spiral path of the third magnetic medium 17 is analogous to similar paths already used in CDs/DVDs and/or hard discs. In use, the light source providing light 4 and/or a readout (in some examples the same light source may be used to read and write, using different power levels) are disposed to be movable along a radius of the disc-shaped substrate 8, whilst the disc-shaped substrate 8 is spun about its axis. Consequently, the third magnetic medium 17 may be well suited for use as part of a hard disc or an optical disc.

Figure 5:
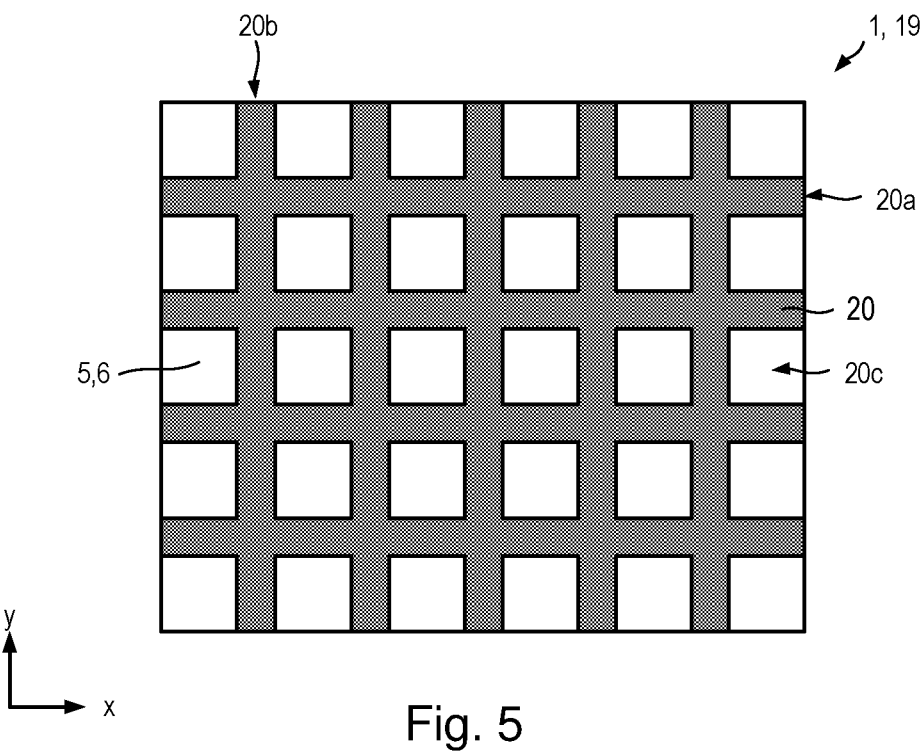
FIG. 5 is a plan view of a fourth example of a magnetic medium.

Referring also to FIG. 5, a plan view of a fourth implementation 19 of the magnetic medium 1 is shown.

The fourth magnetic medium 19 includes a magnet structure 2 in the form of a magnetic layer 20 patterned to form a mesh. The mesh takes the form of the union of an array of first struts 20a extending along a first direction x and spaced apart in a second direction y, with second struts 20b extending along the second direction y and spaced apart in the first direction x. In practice, the magnetic layer 20 may be formed by depositing a uniform layer and then etching to remove the open regions 20c of the mesh.

Although shown as a square mesh in FIG. 5, the first and second directions need not be perpendicular. Equally the spacing of the first struts 20a need not be equal to spacing of the second struts 20b. Other shapes of mesh, for example triangular, may also be used. There is no requirement that the mesh be regular, and a mesh may be formed by etching/removing open regions 20c in an irregular pattern.

Figure 6:
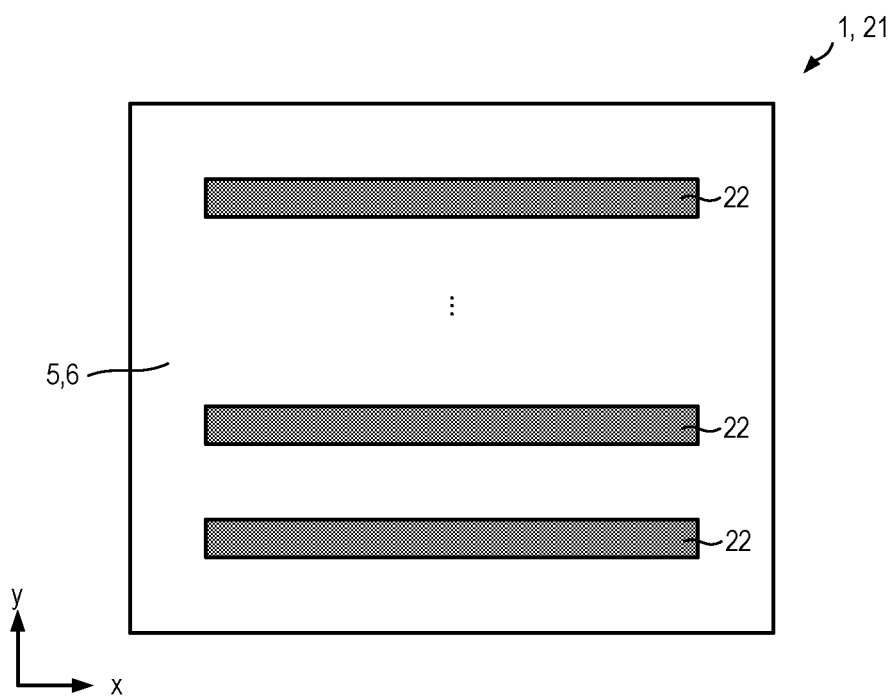
FIG. 6 is a plan view of a fifth example of a magnetic medium.

Referring also to FIG. 6, a fifth exemplary implementation 21 of the magnetic medium 1 is shown (hereinafter the "fifth magnetic medium").

In the fifth magnetic medium 21, the thin film magnet structure 2 takes the form of one or more nanowires 22 of the ferromagnetic alloy or compound. The nanowires 22 each extend in a first direction x, and are spaced apart in a second direction y. The fifth magnetic medium 21 may be formed by, for example, deposition of a uniform magnetic layer, followed by etching to remove the unwanted material.

In this example, the ferromagnetic alloy or compound is preferably a material having substantially anisotropic magnetic properties. For example, the value of the magnetocrystalline anisotropy constant $K_u$ for the ferromagnetic alloy or compound may be around or greater than that of nickel (6000 J/m$^3$), that of chromium dioxide (14000 J/m$^3$), or that of iron (47000 J/m$^3$).

Using a ferromagnetic alloy or compound having substantial in-plane magnetic anisotropy, the crystalline axes of the ferromagnetic alloy or compound may be arranged (for example by control of the crystalline orientation of the substrate 8 surface) such that the magnetization(s) of the domain(s) in are oriented in-plane, and perpendicular to the long axis x (i.e. the magnetisations are parallel/anti-parallel to the second direction y). One possible ferromagnetic alloy or compound for this purpose is chromium dioxide ($CrO_2$).

Alternatively, the ferromagnetic alloy or compound and/or the orientation of its crystalline axes may be selected/controlled such that the magnetization(s) are oriented out-of-plane. For example, the nanowires 22 may take the form of layered structures or may be formed using alloys of cobalt and platinum (Co/Pt), iron and palladium (Fe/Pd) or a different composition with substantially perpendicular magnetic anisotropy.

In still other examples, high magneto-crystalline anisotropy need not be used, and the magnetization(s) may be permitted to adopt orientations in-plane, parallel to the long axis x. This may be possible if it will be energetically favourable (in view of materials, width, thickness and so forth) for each nanowire 22 to support multiple ferromagnetic domains along its length.

In general, the thin film magnet structure 2 of the magnetic medium 1 or any of the first to fifth magnetic media 12, 15, 17, 19, 21 may be formed as a single epitaxial layer. However, this is not always the case, and in some implementations the thin film magnet structure 2 may include more than one layer. For example, the thin film magnet structure 2 may comprise a magnetic layer interposed between two non-magnetic layers, each formed from a material which is not a ferromagnetic alloy or compound such as, for example, sub-monolayer 'delta-doped' iron in palladium or platinum.

In other implementations, a non-magnetic layer (i.e., formed from a material which is not a ferromagnetic alloy or compound) may be interposed between two magnetic layers of any type described herein.

Figure 7:
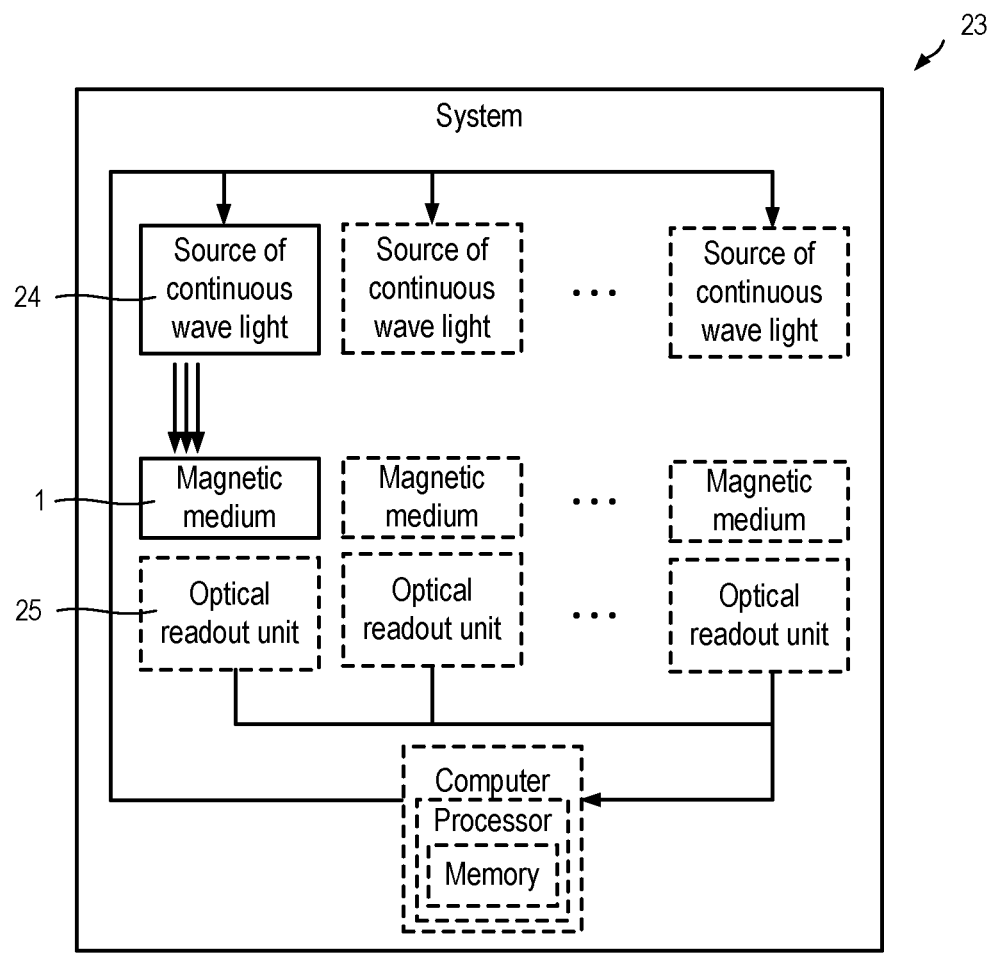
FIG. 7 is a schematic diagram of a system including a magnetic medium.

Referring also to FIG. 7, a block diagram of a system 23 including a magnetic medium 1 and a source of continuous-wave light 24 is shown.

The system 23 is configured to use the source of continuous-wave light 24 to write information to the magnetic medium 1 using all-optical magnetic switching of ferromagnetic domains of the magnetic medium 1. For example, by scanning a light spot 14 over an arrangement of nanomagnets 13, 16, 18, or along struts 20a, 20b or nanowires 22.

The system 23 may optionally include further sources 24 of continuous-wave light and/or further magnetic media 1. There may be a single light source 24 for each magnetic medium 1. Alternatively, if the magnetic medium 1 is configured to have ferromagnetic domains selectively sensitive to different wavelengths (see for example the second magnetic medium 15), then multiple light sources 24 having different emission wavelengths may correspond to each of one or more magnetic media 1.

Unless the system 23 is intended to be read-only (for example for long term archiving), the system will also include a mechanism for reading date from the magnetic medium (or media). For example, the system 23 may be configured for optical readout of magnetization(s) using one or more optical readout units 25. Each of the one or more optical readout units 25 may include an analyser polarising filter and a detector for detecting the intensity of light as a function of polarisation angle. The optical readout units 25 may be configured to read magnetization(s) of the magnetic medium 1 using the magneto-optical Kerr effect.

Alternatively, the system 23 may be configured to readout information stored on the magnetic medium 1 (or media) using a magnetic readout mechanism (not shown), for example each magnetic medium 1 may have a corresponding magnetic read head sensor (of the type used for a conventional hard disc).

The system 23 may include a computer (for example microcontroller) having a processor and memory to control the system, and/or store and/or process magnetization data.

The magnetic medium 1 may be any one (or a combination) of the first to fifth magnetic media 12, 15, 17, 19, 21. In some implementations, the magnetic medium 1 (or media) may be removable from the system 23 for separate storage.

Experimental and Theoretical Studies of Particular Implementations

The preceding descriptions of the magnetic medium and systems utilising it may be further understood with reference to some particular examples of implementation and corresponding experimental and/or theoretical analyses.

Figure 8:
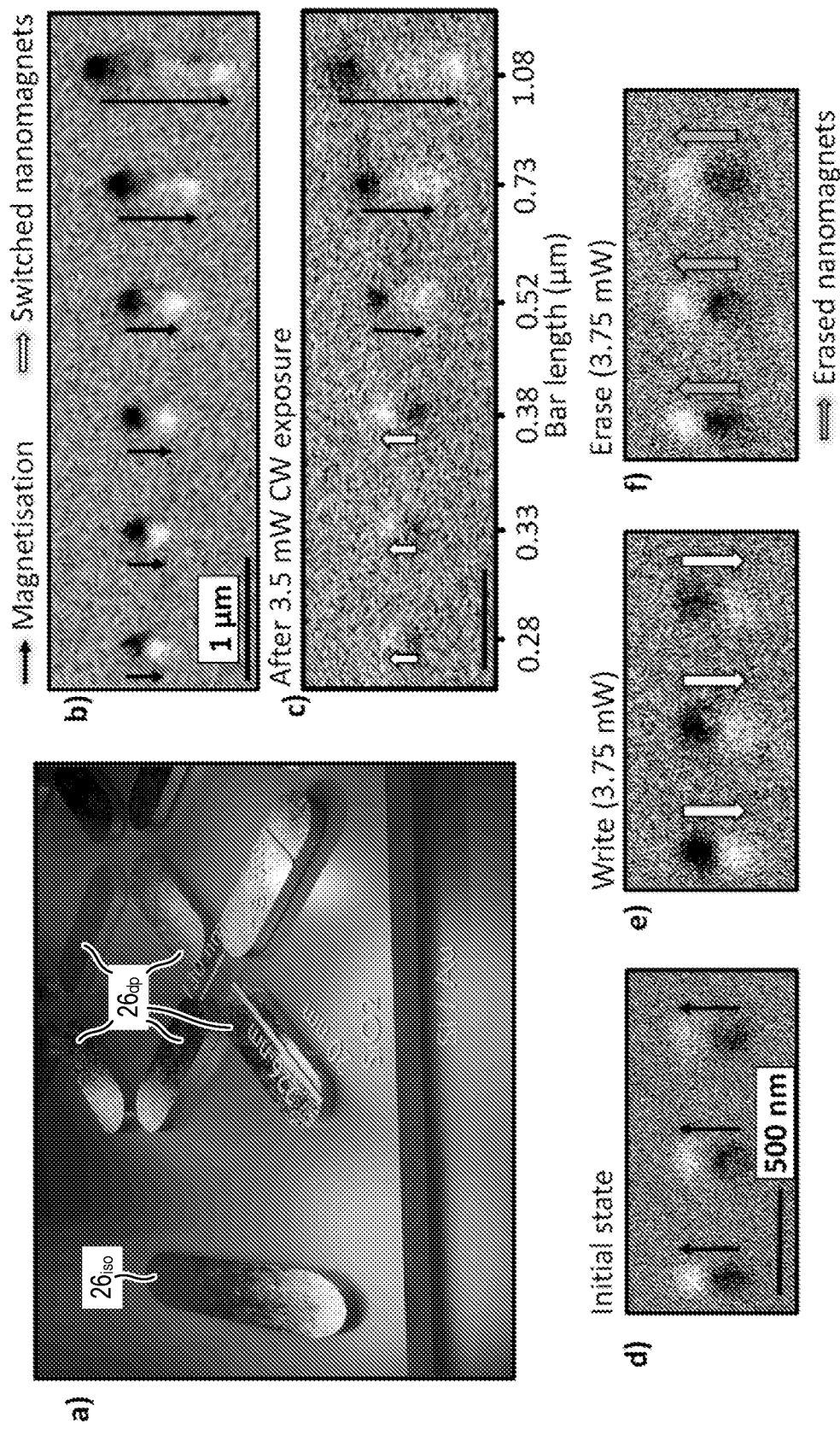
FIG. 8 shows a schematic of a portion of a magnetic medium, along with various experimental characterisations.

Referring also to FIG. 8, a schematic of a portion of another example of the magnetic medium 1 is shown, along with various experimental characterisations.

FIG. 8 a) shows a schematic of an isolated nanomagnet $26_{iso}$ and densely-packed nanomagnets $26_{dp}$ exposed with a linearly-polarised CW laser. The nanomagnets $26_{iso}$, $26_{dp}$ were patterned on top of an Au/SiO$_2$ (290 nm) substrate. The Au layer provided a reflective lower surface and the SiO$_2$ provides a dielectric layer. The nanomagnets $26_{iso}$, $26_{dp}$ formed parts of the magnet structure 2 in this example (see, for example, FIG. 2). The isolated Ni$_{81}$Fe$_{19}$ (permalloy) nanomagnets were separated by 1 μm (such that dipolar interactions are negligible) were exposed to illumination.

FIG. 8 b) shows magnetic force microscopy (MFM) images of (isolated) bars with varying lengths (L) after global-field saturation. Each bar comprises a positive (light) and negative (dark) charge revealing magnetisation direction, indicated by adjacent arrows. FIG. 8 c) shows the same bars after exposure to a λ=633 nm linearly-polarised (parallel to the bar long-axis) CW laser with a 1 μm spot size at a power of 3.5 mW traversing perpendicular to the bar long axis. Magnetic switching may be observed in the three left-most bars (L≤380 nm).

FIG. 8 d) shows MFM images of three nanomagnets with L=280 nm after global-field saturation. FIG. 8 e) shows subsequent switching of the three nanomangnets after linearly-polarised CW exposure with 3.75 mW. It may be observed from FIG. 8 f) that the bars switch back following a second 3.75 mW exposure, thus demonstrating the ability to rewrite/erase previously written states.

In another experiment, the densely-packed nanomagnets $26_{dp}$ with sub-diffraction limit dimensions arranged in a square ASI geometry were exposed. Switching selectivity between x and y aligned nanomagnets was achieved via aligning laser polarisation along the long axis of the desired nanomagnet subset to be reversed (see FIGS. 9A, 9B, and 12). Single nanomagnetic switching was achieved via static beam exposure. It was observed that all ASI vertex types could written, irrespective of the microstate energy. Furthermore, it was observed that chains of switched magnetization in nanomagnets was achieved via exposure to a scanning beam (see FIG. 12), thus allowing lithographic design of the microstate of the network. Switching was observed at incident powers as low as 2.74 mW. Nanomagnets formed from $Ni_{50}Fe_{50}$ and nanomagnets formed from Co were also illuminated, with switching observed for $Ni_{50}Fe_{50}$.

The all-optical switching mechanism requires strong polarisation-dependent absorption of light in nanomagnets. The size and shape of the nanomagnets thus have dual roles controlling both magnetic behaviour and the polarisation-dependent optical absorption. There are three mechanisms to absorb incident light: the plasmonic antenna resonance, a plasmonic grating effect due to the in-plane periodicity and the interference effect of reflection from the substrate-silica interface. It was observed that the latter mechanism dominates and this advantageous since the nanomagnet dimensions are relatively free from restrictive plasmonic antenna design considerations and nanofabrication imperfections-allowing a wide range of compatible nanomagnet dimensions and array geometries. In these experiments, it was found that partial reflections from the substrate-silica and silica-nanomagnet-air interfaces interfere destructively when the $SiO_2$ is approximately an integer multiple of a quarter wavelength in optical depth. Without wishing to be bound by theory, it is believed that the cancellation of reflection and the minimisation of transmission was found to combine to maximise the absorption.

Referring also to FIGS. 9A, 9B, 9C, and 9D, experimental and simulation data relating to a nanomagnet array are shown.

Figure 9A:
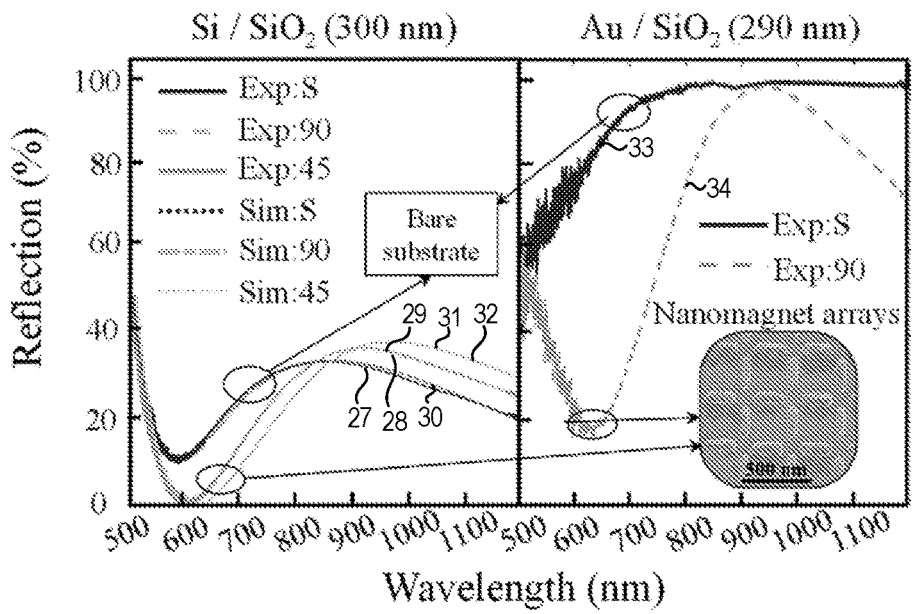
FIGS. 9A, 9B, 9C, and 9D show experimental characterisations and simulation data relating to a nanomagnet array.
Figure 9B:
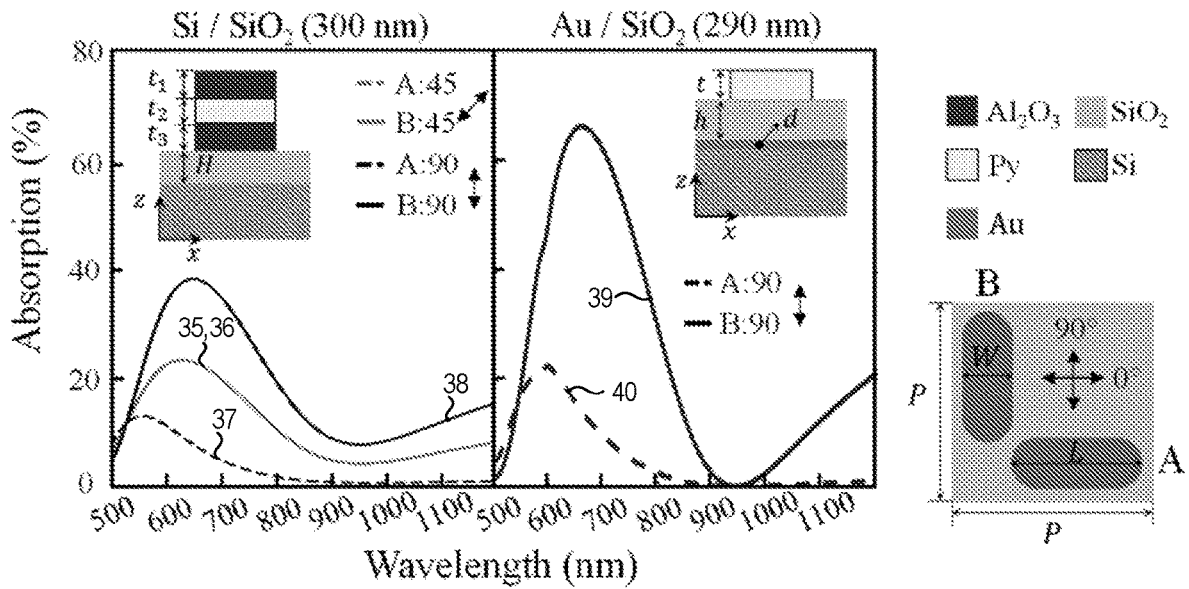

FIG. 9A shows a first series 27 corresponding to experimental ('Exp') Fourier Transform Infrared (FTIR) spectroscopy of a $Si/SiO_2$ substrate, a second series 28 corresponding to experimental FTIR spectroscopy of a commercially available $Si/SiO_2$ substrate on which a nanomagnet array of spatial extent 2 mm×2 mm and a nanopattern described according to the schematic in FIG. 9B with dimensions L=226 nm, W=78 nm and P=356 nm is disposed and the polarisation of the incident light is 90°, a third series 29 corresponding to experimental FTIR spectroscopy of a $Si/SiO_2$ substrate on which a 2 mm×2 mm nanomagnet array is disposed and the polarisation of the incident light is 45°. FIG. 9A also shows a fourth series 30 which is a simulation ('Sim') corresponding to the first series 27, a fifth series 31 which is a simulation corresponding to the second series 28, and a sixth series 32 corresponding to the third series 29. FIG. 9A also shows a seventh series 33 corresponding to experimental FTIR spectroscopy of a bare high reflectivity $Au/SiO_2$ substrate, and an eighth series 34 which is a measurement corresponding to the seventh series 33 on which a 2 mm×2 mm nanomagnet array is disposed on the $Au/SiO_2$ substrate and the polarisation of the incident light is 90°. The inset shows an SEM micrograph of a nanomagnet array that was measured.

Correspondence between experiment and simulation may be observed. The addition of the permalloy nanomagnet layer was found to introduce absorption that modifies the partial reflections from the substrate-silica and silica-air interfaces. Strong absorption in the nanomagnets may be observed to correspond to the condition where these partial reflections destructively interfere, as shown by the reflectivity minimum near 600 nm in FIG. 9A). For a 28% fill factor of the permalloy SI system, the total reflection from the device was found to be <1%, corresponding to a calculated absorption of 38% and 65% for the $Si/SiO_2$ and $Au/SiO_2$ substrates respectively, as shown in FIG. 9B.

FIG. 9B shows a first series 35 corresponding to calculated absorption in permalloy for horizontal permalloy bars in a nanomagnet array fabricated on $Si/SiO_2$ with dimensions $t_1$=15 nm, $t_2$=20 nm, $t_3$=15 nm, h=300 nm for a laser polarisation angle of 45° relative to the horizontal, a second series 36 corresponding to calculated absorption in permalloy for vertical permalloy bars in the same nanomagnet array for a laser polarisation angle of 45° relative to the horizontal, a third series 37 corresponding to calculated absorption in permalloy for horizontal permalloy bars in the same nanomagnet array for a laser polarisation angle of 90° relative to the horizontal, and a fourth series 38 corresponding to calculated absorption in permalloy for vertical permalloy bars in the same nanomagnet array for a laser polarisation angle of 90° relative to the horizontal. FIG. 9B also shows a fifth series 39 corresponding to calculated absorption in permalloy for horizontal permalloy bars in a nanomagnet array fabricated on $Au/SiO_2$ with dimensions h=290 nm and t=20 nm, and a sixth series 40 corresponding to calculated absorption in permalloy for vertical permalloy bars in the same nanomagnet array. The schematic illustrates nanomagnet array dimensions, structure and unit cell with L=226 nm, W=78 nm and P=356 nm.

The difference in absorption in the horizontal (A) and vertical (B) permalloy bars are shown for laser polarisation angles of 45° and 90° relative to the horizontal, and highlight the contrast and subset selectivity afforded. It was found that it was possible to achieve up to 65% and up to 38% absorption in the arrays on $Au/SiO_2$ and the arrays on $Si/SiO_2$ respectively. Without wishing to be bound by theory, it is believed that the enhanced absorption observed for $Au/SiO_2$ arises as the transmission into the substrate was inhibited by the gold under-layer. Other high reflectivity materials (e.g., Al) may also be used. Furthermore, the high aspect ratio of the nanomagnets was found to provide an optical polarisation response; light was absorbed dominantly in antennas whose long axis was aligned to the optical polarisation. FIG. 9B shows that at a wavelength of 633 nm, the absorption ratio for polarisation along long and short axis was a factor>4. This was found to enable selective optical switching by controlling the incident polarisation.

Figure 9C:
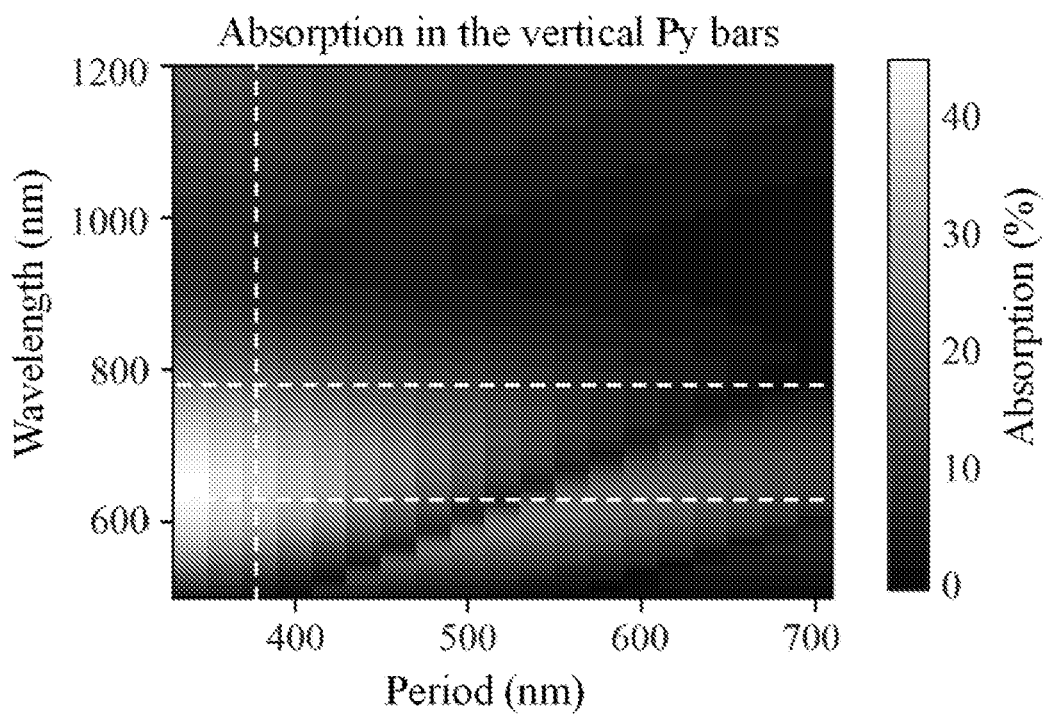
Figure 9D:
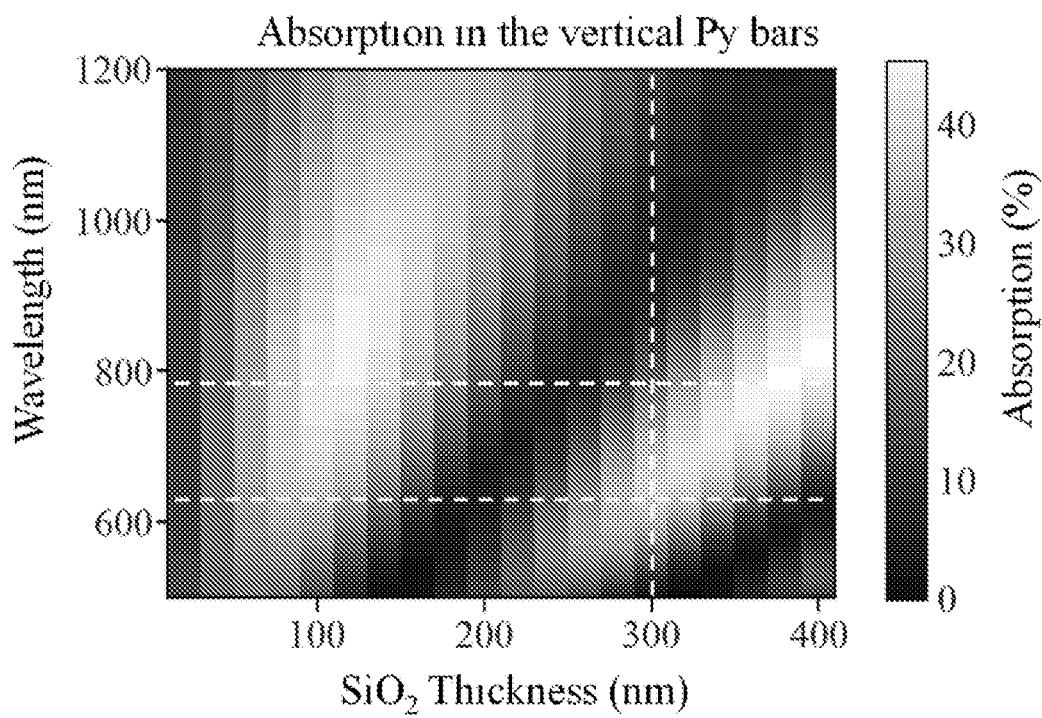

FIGS. 9C and 9D show simulated optical absorption in the permalloy layer of nanomagnet array for varying unit cell period and $SiO_2$ thickness respectively. In FIG. 9C the results of fixing the nanomagnet geometry and silica thickness, but varying the periodicity, are shown. This was found to lead to a diffraction order near a wavelength of 633 nm for a periodicity>500 nm, which decreases the absorption and thus was found to be unfavourable. Other periodicities and isolated nanomagnets were found to perform well. FIG. 9D considers a fixed antenna geometry and varies the silica thickness, again being found to exhibiting diffraction orders.

Here, the thickness of the silica was 300 nm, giving a resonance near the 633 nm wavelength of a He—Ne laser. The final absorption mechanism concerning the localised plasmonic antenna resonance of each individual nanomagnet was explored in calculations as further described hereinafter. The nanomagnets were found to have no clear plasmonic resonance that could provide strong absorption in the permalloy. Thus, it was found that for periodicity<500 nm, the substrate interference phenomenon is the dominant absorption mechanism.

Having observed switching in isolated nanomagnets, densely-packed sub-diffraction limited nanomagnets arranged in a square ASI geometry, patterned onto a $SiO_2$ (300 nm)/Si substrate, were exposed. Here, the silicon provided a reflective lower surface 5 and the $SiO_2$ provided a dielectric layer 6. Silicon was selected to demonstrate the efficacy of the switching technique on commercially available, sub-optimal substrates. Nanomagnet dimensions were L=226 nm, W=78 nm and P=356 nm. Strong interactions at each ASI vertex provided four vertex types with differing energies, providing a challenging testing ground for the switching technique as local dipolar interactions will oppose reversals.

Figure 10:
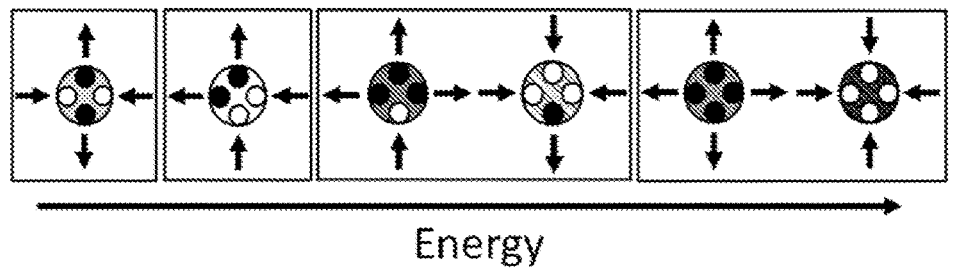
FIG. 10 shows a schematic and experimental characterisations relating to single nanomagnet switching in a dense array.
Figure 10:
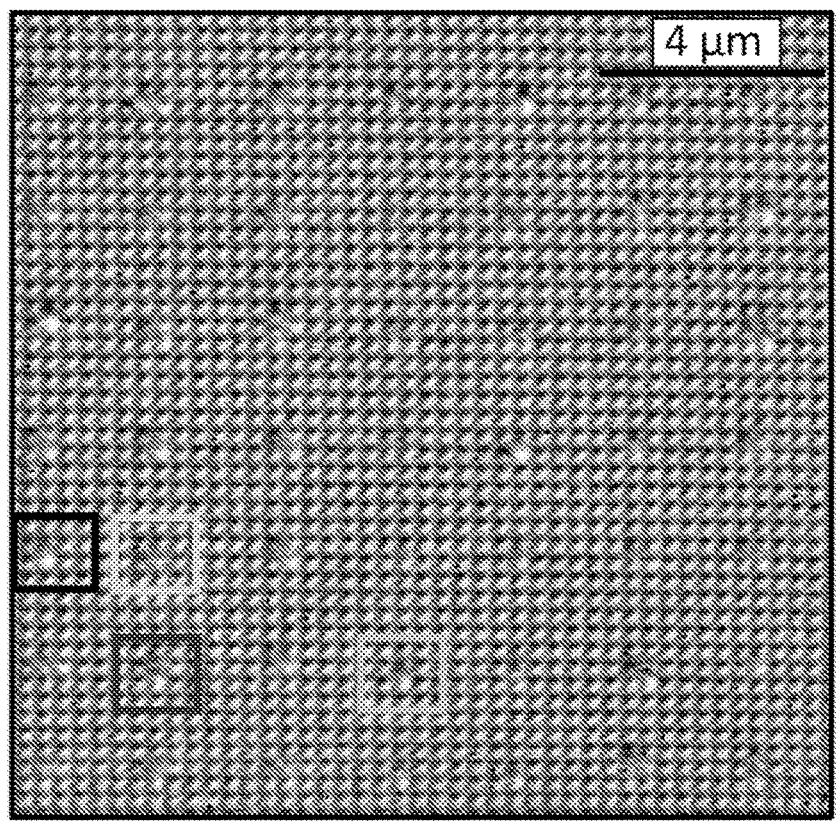

Referring also to FIG. 10, single nanomagnet switching in a dense array is shown.

FIG. 10 *a*) shows schematically the vertex configurations in square ASI (further discussion of vertex energies is described hereinafter).

FIG. 10 *b*) shows an MFM image showing a grid of reversals after λ=663 nm laser exposure with a 1 μm focal spot at 5 mW for 0.25 s.

The effects of exposing ASI to a λ=633 nm CW laser at an incident power of 5 mW for 0.25 s were investigated. The focal spot size of the laser was 1 μm. Prior to exposure, the ASI was initialised with a global-field producing a saturated state. FIG. 10 *b*) shows the array microstate after exposure to a variety of different polarisations. Single and multiple switches were observed in the majority of exposed regions.

Figure 11:
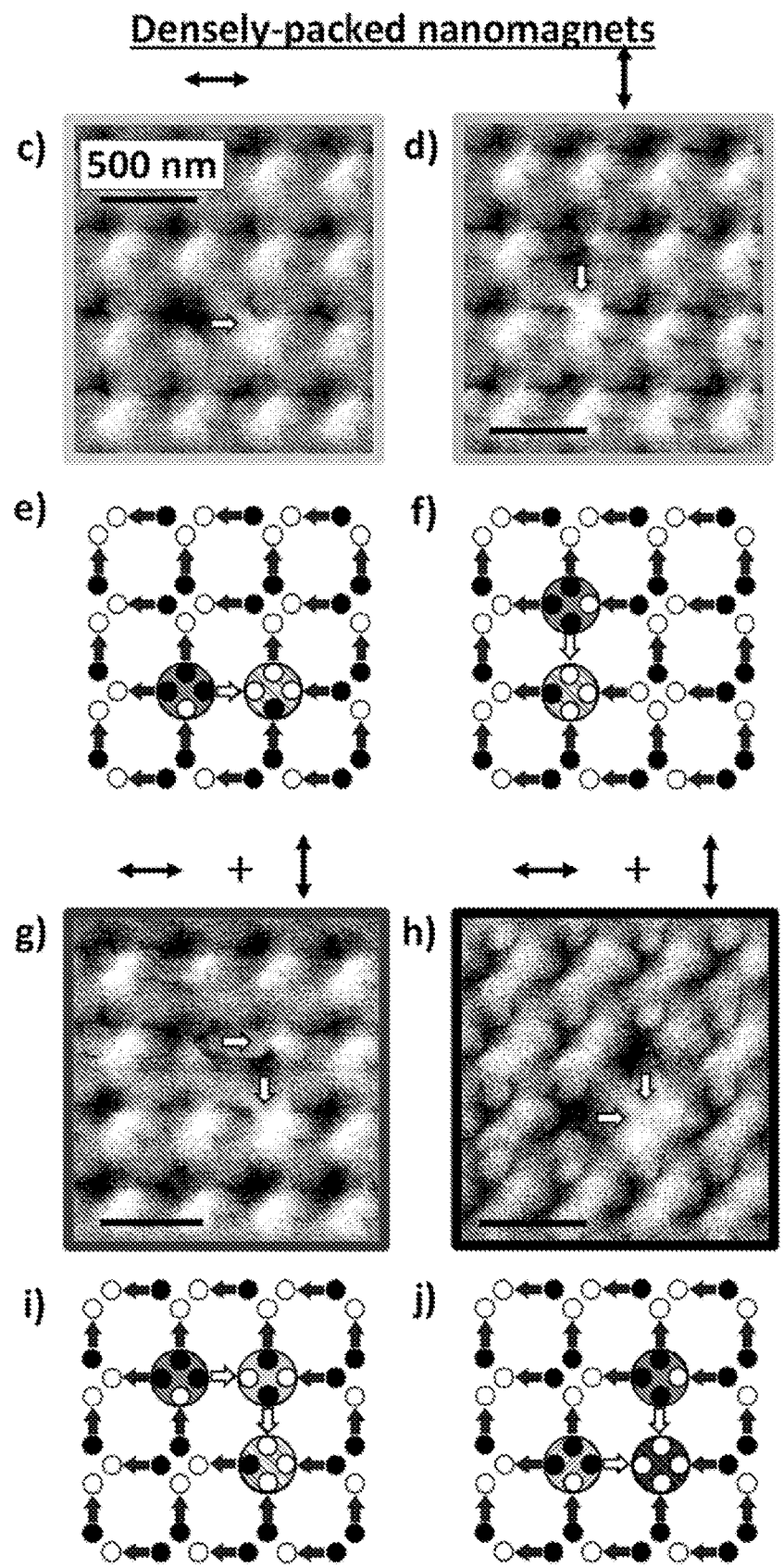
FIG. 11 shows schematics and experimental characterisations relating to single nanomagnet switching in a dense array.

Referring also to FIG. 11, single nanomagnet switching in a dense array is shown.

FIG. 11 shows MFM images and schematics after exposure with the polarisation aligned along x (c,e), y (d,f) and x followed by y (g-j). When exposing the array to a single (c-f), it was observed that the magnetisation of a single nanoisland with long axis perpendicular to the polarisation switches. Without wishing to be bound by theory, it is believed that the selectivity arises from the polarisation dependent absorption shown in FIG. 9B, which forms a higher energy microstate comprising a pair of type 3 vertices surrounded by the saturated type 2 lattice. It was found that exposing x—then x—polarised light results in the flip of two nanoislands (one from each subset). Here both low energy Type 1 (FIG. 11 *g,i*) and high-energy Type 4 (FIG. 12 *h,j*) may be written. The ability to write a type 4 vertex strongly suggests that the switching occurs in a deterministic manner (a discussion considering energetics is described hereinafter). Despite the relatively large focal spot size compared to the nanomagnet dimensions, only a single sub-diffraction limited nanomagnet was switched during each exposure. Without wishing to be bound by theory, it is believed that this arises from the Gaussian distribution of power across beam combined with enhanced interference at the centre of the beam. These results demonstrate that the scheme described herein can be used for high-precision 'writing' of nanomagnetic microstates in dense arrays at a single-element level, a highly desirable functionality for next-generation memory storage and computation applications.

The switching behaviour during exposure to a scanning incident beam has been explored. Here, the beam was controlled to traverse the entire 30 μm array at 16 μm/s, therefore exposing each nanomagnet for 1.25 ms. The relative angle between the polarisation and the scan direction was either 0°, 45° or 90°.

Figure 12:
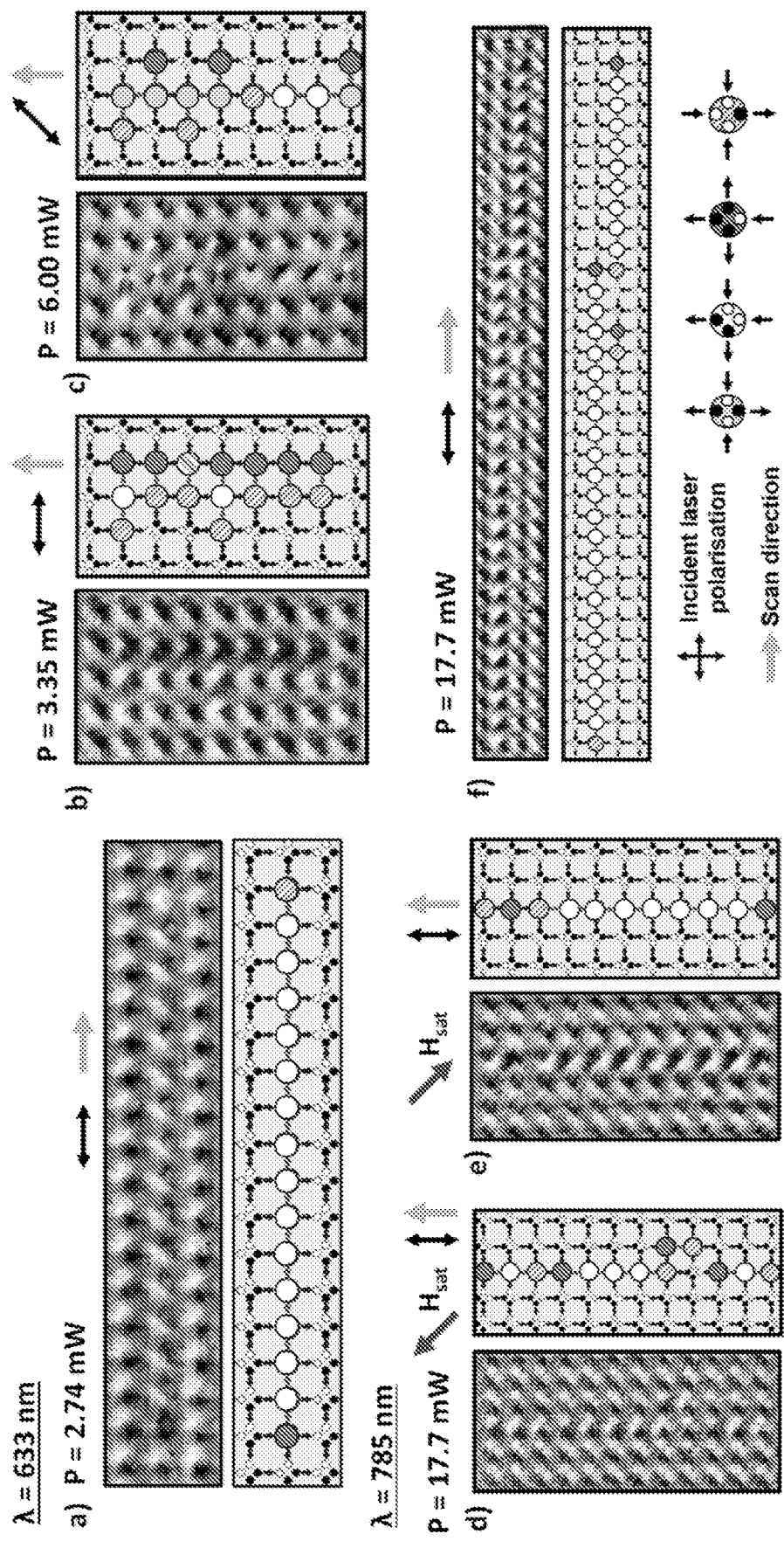
FIG. 12 shows experimental characterisations and schematics relating to switching chains of nanomagnets are shown.

Referring also to FIG. 12, MFM images and schematics relating to switching chains of nanomagnets are shown.

FIG. 12 shows MFM images and schematics of the magnetisation switching following a series of illuminations incident wavelengths of 633 nm (FIG. 12 *a-c*) and 785 nm (FIG. 12 *d-f*). At 633 nm wavelength, switching was found to occur at powers as low as 2.74 mW, while 785 nm wavelength switching was found to have an optimum incident power of 17.7 mW; as expected due to the lower absorption at this wavelength (see FIG. 9B). Parallel polarisation and scan direction (FIG. 12 *a,d-f*) were found to give rise to long chains of switches where subsequent switches share a common vertex. It was found that these take the form of two type 3 vertices connected by a chain of reversed type 2 vertices. After the initial type 3 injection, it was found that subsequent reversals occur on the same vertex, driving the type 3 vertices apart and leaving a type 2 state in its wake. The overall system energy therefore was found to not increase after the initial switching event. Here, up to 22 consecutive reversals were observed.

Perpendicular polarisation and scan direction (FIG. 12 *b*) were found to result in a pair of T3 vertices for each switching event (in some cases there are two switches), as seen in static exposure protocol, continually increasing the system energy. A high switching fidelity was observed (up to 7 consecutive reversals) further demonstrating deterministic reversal. When the polarisation was set at 45° to the scan direction (FIG. 12 *c*) both subsets received equal power and were found to be able to switch. Here, a higher power was required as expected. It can be observed that chains of type 1 vertices require both subsets to switch. FIG. 12 *d*) and FIG. 12 *e*) show MFM images and schematics after saturating the same array in opposite directions and exposing to a scanning beam (λ=785 nm) with polarisation parallel to the scan direction. Any stray field that assists reversal in one direction will oppose reversal in the other. Switching was observed in both cases, thus, without wishing to be bound by theory, any external field contribution to reversal was ruled out. Furthermore, the switching was consistent across multiple samples on Si/SiO₂ (not shown). For Au/SiO₂ substrates, switching across a wide range of dimensions (up to 1 μm bar length) at similar powers was observed (further described hereinafter). FIG. 12 *f*) shows similar writing characteristics to the shorter wavelength but at 6× power increase due to the lower absorption at this wavelength.

These results demonstrate a means of all-optical magnetic switching in both isolated and densely-packed nanomagnets with no external field requirement at low powers (2.74 to 6 mW) and power densities (0.35 to 0.74 $MW/cm^2$ for a 1 μm spot size) where sub-diffraction limited reversal was achieved through polarisation selectivity. The absorption profiles were found to allow for read/write functionality by tuning the incident wavelength (e.g., write at 633 nm, read at 900 nm). Here, the potential mechanism of this deterministic reversal is discussed.

Without wishing to be bound by theory, it is believed that the deterministic switching into any allowed magnetic state with the same sample mounting (FIG. 12 *d,e*) excludes field-driven heat-assisted switching from unintentional stray fields in the systems studied. Reference is made to: M. Pancaldi, N. Leo, and P. Vavassori, Nanoscale 11, 7656

(2019). In this example, circularly polarized light was not used, which precluded helicity-dependent processes. Without wishing to be bound by theory, it is believed that these results are also not consistent with thermalization effects from stochastic switching via heating nanomagnets beyond the Curie temperature $T_c$ or the superparamagnetic limit. It was found that the written high-energy, low entropy monopole defect states are never favoured by thermalization. In FIG. 12 f) 22 consecutive switches were observed with a corresponding thermalisation probability of $0.5^{22}=2.3\times10^{-7}$. Without wishing to be bound by theory, it is believed that the low-power illumination would not heat the lattice temperature above 380 K. Magnetometry measurements between 120-380 K of a 2×2 mm ASI array with equivalent dimensions is shown hereinafter, and only a 10% drop in the magnetisation was observed between 120-380 K, indicating that the studied nanomagnet samples were not being heated close to $T_c$.

Existing all-optical magnetic switching theories depend strongly on the materials employed and the optical excitation method. In some examples, continuous-wave stimulation may be modulated, once a minimum switching time for the particular structure has been determined. Optical pulse-duration was varied between studies and it was found that increasing the duration does not significantly enhance switching fidelity. This precluded the necessity for CW exposure. Multi-pulse all-optical magnetic switching in ferromagnets occurs through an initial demagnetisation regime leaving a multi-domain state followed by subsequent domain growth. The later stage requires circularly polarised light which facilitates the preferential growth of one domain orientation via the Inverse Faraday Effect, dichroism effects or thermally-induced domain wall motion. Here, the Inverse Faraday Effect was ruled out due to the linearly polarised exposure.

Single-shot switching has primarily been observed in ferrimagnets with the requirement of two antiferromagnetically coupled magnetic sublattices with different relaxation timescales. Reference is made to: T. Ostler et al., Nat. Commun. 3, 1 (2012); and C. Stanciu et al., Phys. Rev. Lett. 99, 217204 (2007). These conditions are not met in ferromagnetic materials. However, there has been recent theoretical and experimental evidence of optically induced spin transfer (OISTR) in ferromagnetic alloys whereby incoming photons may excite electrons between minority bands of a heterogeneous material provided that the band structure meets the necessary requirements. Reference is made to: M. Hofherr et al., Sci. Adv. 6, eaay8717 (2020); and J. Dewhurst et al., Nano Lett. 18, 1842 (2018). Without wishing to be bound by theory, it is believed that there should be an available transition between two spin minority bands at the incident photon energy and no available transitions in the spin majority bands. These studies do not observe switching, yet previously observed single-pulse helicity-independent switching was observed in Co/Pt multilayers which possess the necessary band structure. Reference is made to: M. Vomir, M. Albrecht, and J.-Y. Bigot, Appl. Phys. Lett. 111, 242404 (2017); and S. Uba et al., Phys. Rev. B 53, 6526 (1996).

The effect was found to be strong in $Ni_{50}Fe_{50}$, more so than permalloy ($Ni_{81}Fe_{19}$), but not present in Co.

To test whether all optical magnetic switching was occurring by a plasmonically enhanced OISTR mechanism, a set of $Ni_{50}Fe_{50}$ (20 nm thickness) and Co (8 nm thickness) nanomagnetic arrays patterned on $Au/SiO_2$ substrates (as shown hereinafter) were fabricated, with the prediction that the switching fidelity would be as good or better in For $Ni_{50}Fe_{50}$ and significantly worse in pure Co. Both predictions were confirmed in the subsequent experiments. For $Ni_{50}Fe_{50}$, switches were observed at 3 mW (14% reduction in power) across a broader range of nanomagnet dimensions compared to $Ni_{81}Fe_{19}$. Conversely, no switches were observed in Co nanostructures up to incident powers of 30 mW. These results indicate the switching mechanism. If an ultrafast process such as OISTR is indeed the mechanism then an interesting question is posed—why is a single deterministic reversal observed even after CW exposure times measured in seconds, rather than multiple stochastic reversals mediated by a continuous OISTR process? The three-temperature model explanation is that the process occurs within a short timeframe after the exposure stimulus following which the system relaxes to an equilibrium, preventing further reversals during that exposure.

Figure 13:
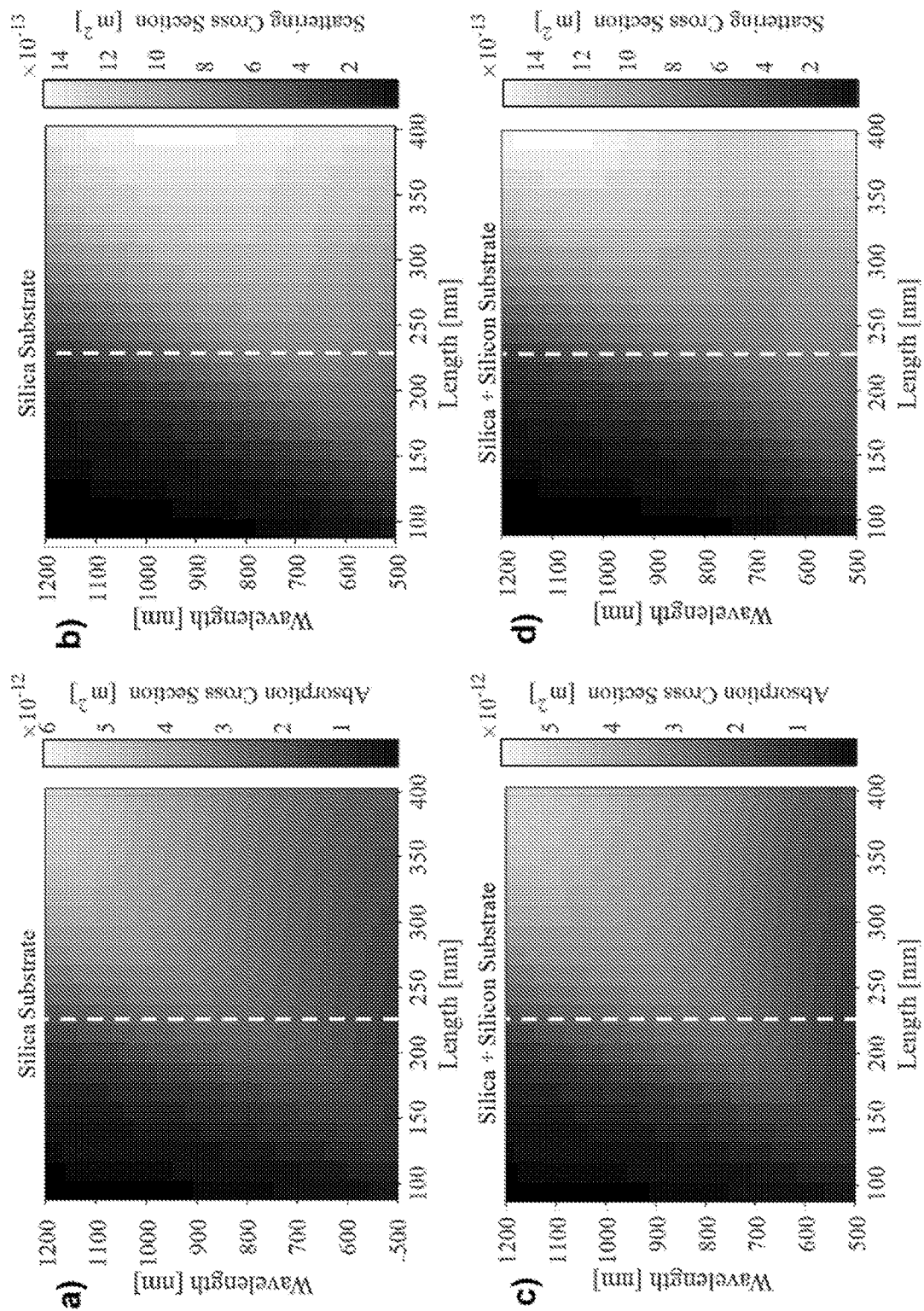
FIG. 13 shows simulation data relating to the simulated localised surface plasmon (LSP) response of nanomagnets.

Referring also to FIG. 13, simulation data is shown.

FIG. 13 shows the simulated absorption (panels a and c) and scattering (panels b and d) cross sections for a single nanomagnet on a silica substrate (panels a and b) and silicon substrate with a 300 nm silica layer (panels c and d). At the nanomagnet lengths and incident wavelengths explored herein, low cross sections were observed. Furthermore, including the silicon substrate only has a weak influence on the LSP response.

Thus, the localised surface plasmon response of the permalloy nanomagnetic particles was explored, and it was concluded that this was not the dominant absorption mechanism.

Figure 14:
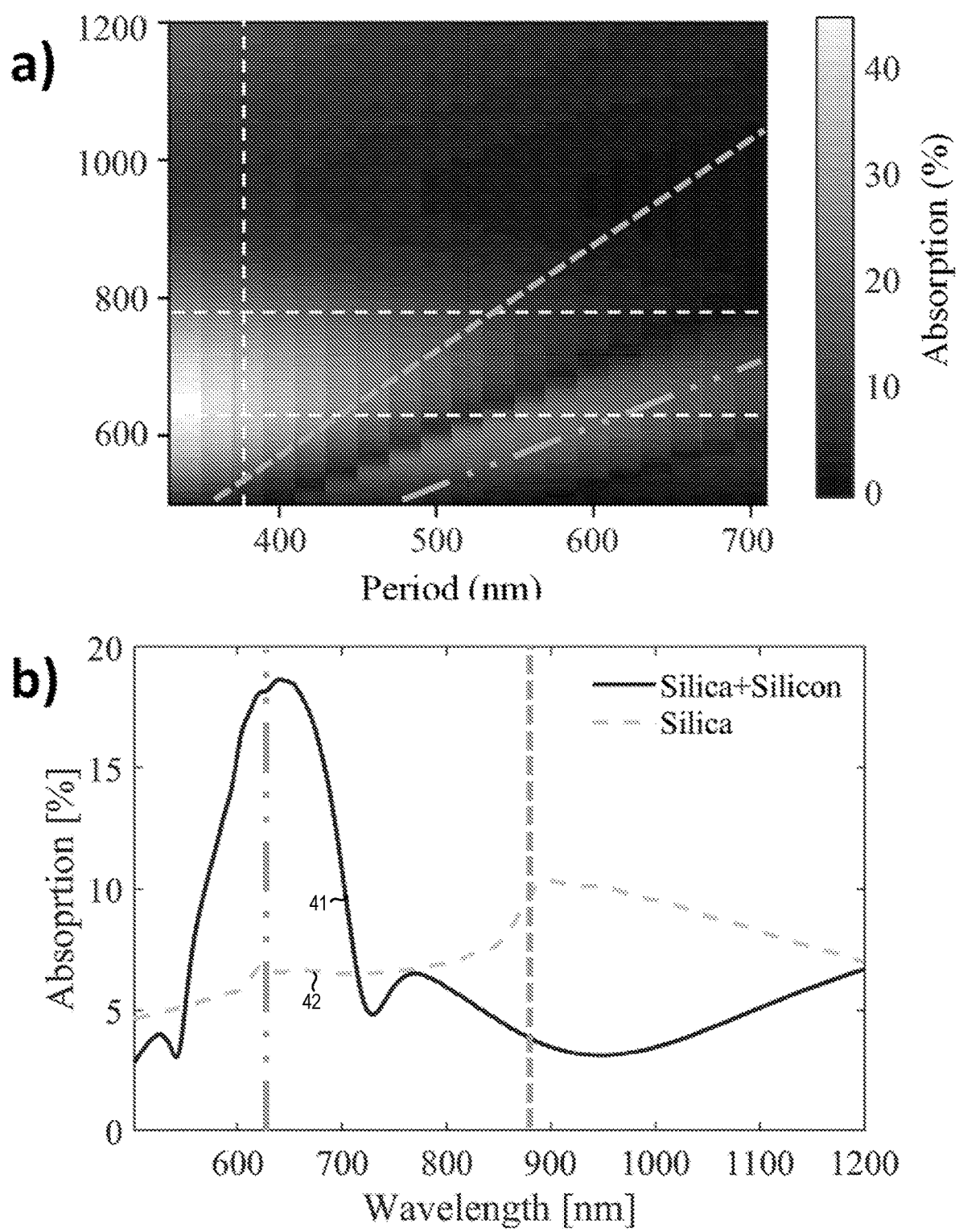
FIG. 14 shows simulated and calculated data relating to the emergence of diffraction orders for large period values.

Referring also to FIG. 14, the emergence of diffraction orders for large period values and their origin is shown.

In FIG. 9C diffraction orders were observed, which were found to decrease the absorption in the permalloy layer of the nanomagnet array. FIG. 14 a) shows an equivalent simulation to FIG. 9C. The vertical dashed line indicates the period of 356 nm used in experiments. The horizontal dashed lines indicate the wavelengths of 633 nm and 785 nm. The dashed lines running diagonally indicate the grating diffraction orders, described by $\lambda=n_{SiO2}P$ and $\lambda=n_{SiO2}P/\sqrt{2}$, where P and $n_{SiO2}$ are the period and the refractive index of the silica substrate, respectively. FIG. 14 b) shows the calculated absorption for a permalloy ASI array with a period P=600 nm for a silica and silicon substrate with 300 nm silica layer. The diffraction orders were found to be blue-shifted for the silicon substrate with a silica layer (corresponding to series 41) which, without wishing to be bound by theory, is attributed to interference within the silica layer (corresponding to series 42). Micromagnetic simulations were used to obtain an estimate of each vertex energies for the nanomagnetic arrays explored in this work.

Figure 15:
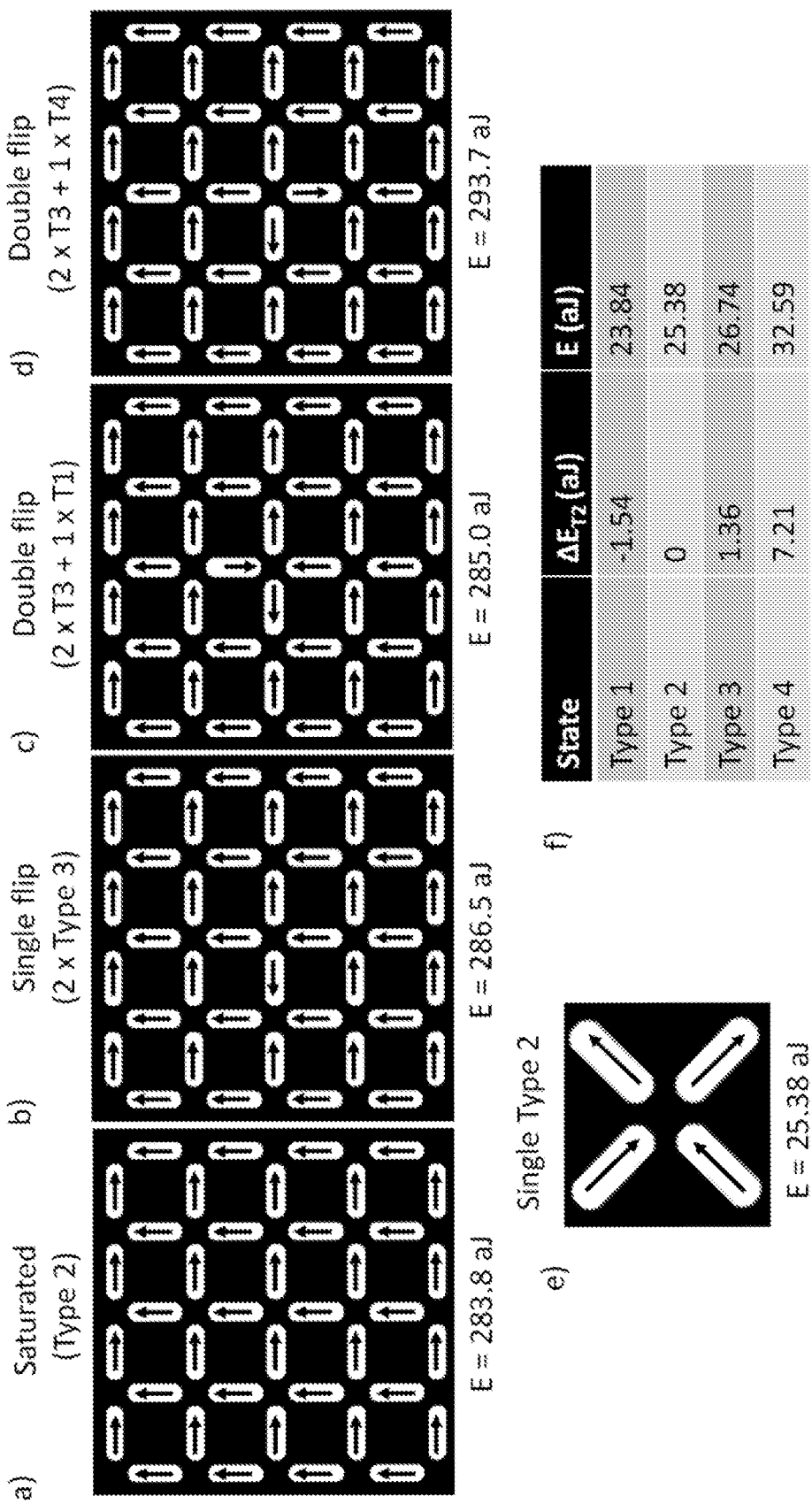
FIG. 15 shows simulated microstate energies of a 5×5 vertex grid obtained from MuMax3.

Referring also to FIG. 15, simulated microstate energies of a 5×5 vertex grid obtained from MuMax3 is shown.

FIG. 15 a) shows microstates and total energies of a) the saturated type 2 state. FIG. 15 b) shows a single spin flip on a saturated background. FIG. 15 c) and FIG. 15 d) show a double flip leaving a central type 1 vertex and type 4 vertex respectively, each with two type 3 vertices. From this the relative energies of each state were calculated. FIG. 15 e) shows microstate and energy of a single type 2 vertex with periodic boundary conditions. FIG. 15 f) shows a table of vertex energies expressed as relative to the T2 state ($\Delta E_{T2}$) and absolute values (E). The temperature was set to 0 K making the energies a likely overestimate.

Figure 16:
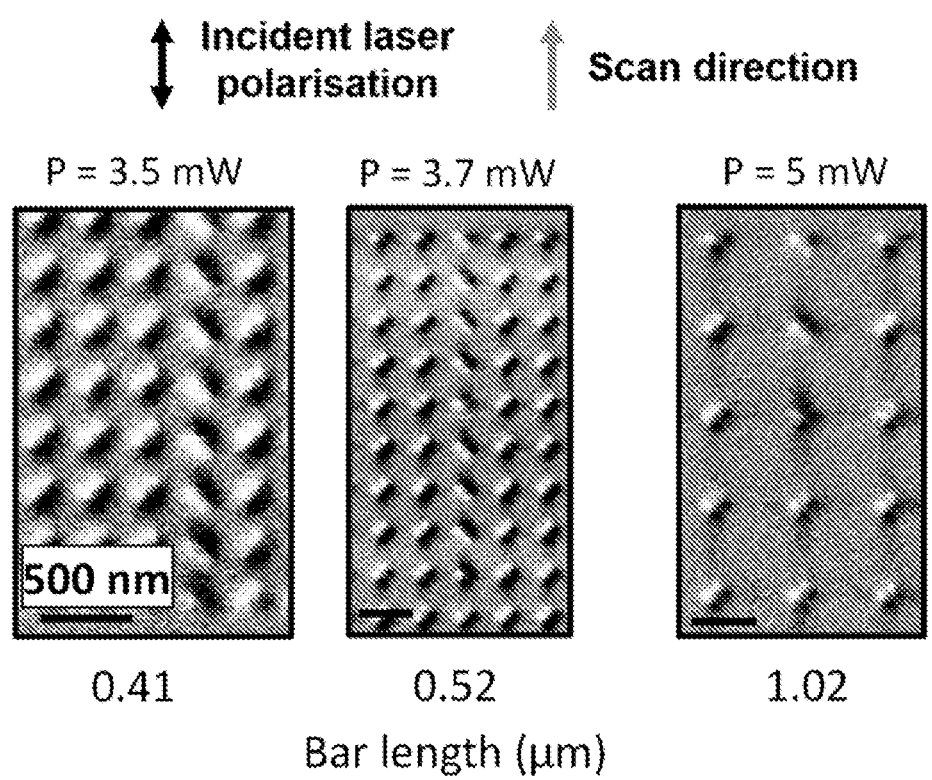
FIG. 16 shows experimental characterisations of switching of nanomagnets with a scanning beam.

Referring also to FIG. 16, scanning beam switching on $Au/SiO_2$ substrates is shown.

FIG. 16 shows MFM images of a range of ASI arrays with increasing bar lengths patterned onto a $Au/SiO_2$ substrate.

Here, the scan direction and polarisation were parallel. It was found that all bar lengths up to 1.02 μm could be reversed, demonstrating the efficacy of the technique when combined with a substrate which inhibits transmission. Here the scan direction and polarisation were parallel.

Figure 17:
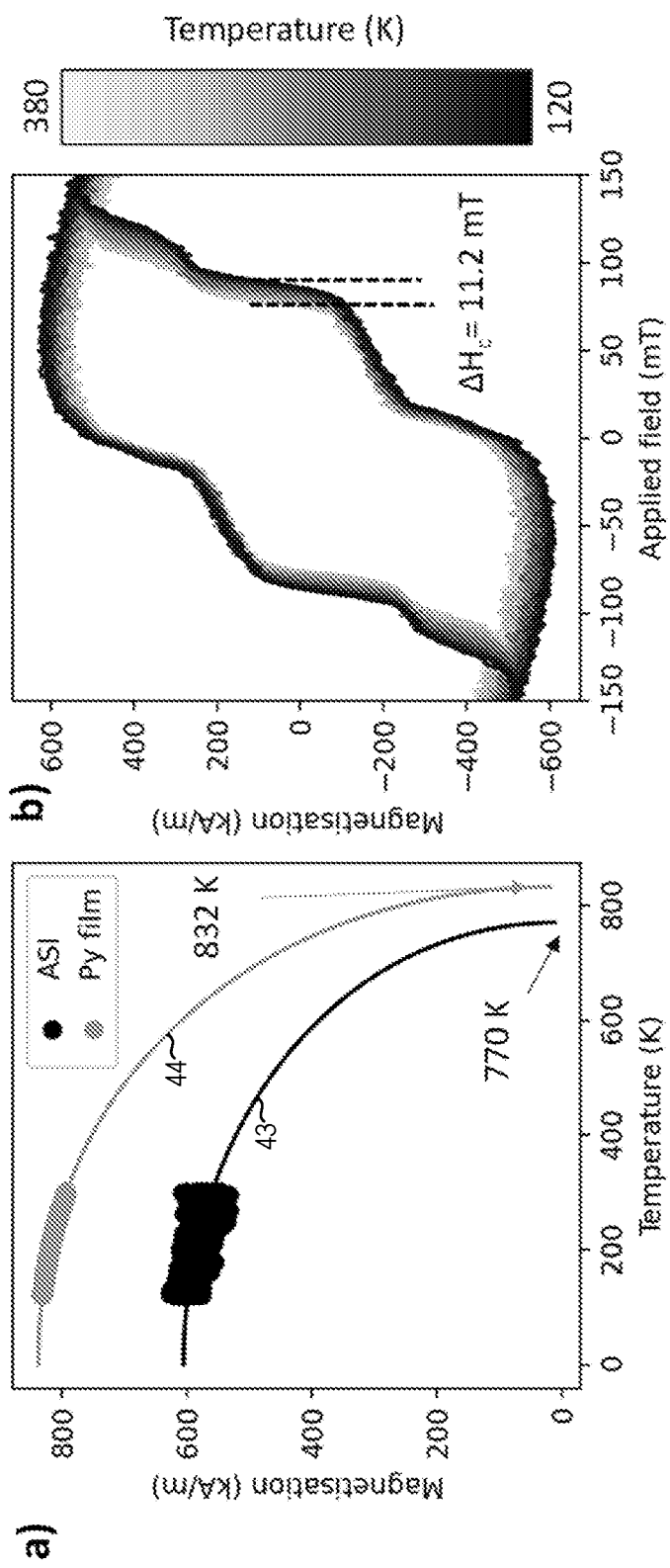
FIG. 17 shows experimental characterisations relating to magnetometry of nanomagnet arrays

Referring also to FIG. 17, magnetization data for an ASI array and thin film is shown.

FIG. 17 a) shows the temperature dependence of magnetisation of a 2 mm×2 mm permalloy square ASI array (corresponding to series 43) and permalloy thin film (corresponding to series 44). The sample was the same one used for the FTIR measurements in FIG. 9A. A 10% reduction in magnetisation was found to occur between 120-380 K. Both datasets were fitted to $M(T)=M(0)(1-(T/T_c)^\alpha)^\beta$ where $T_c$ is the Curie temperature, $M(0)$ and $M(T)$ are the magnetisation at 0 K and T K respectively and a and b are empirical constants where $a_{ASI}=2$, $a_{film}=2.18$, $b_{ASI}=0.476$, $b_{film}=0.476$. Reference is made to M. Kuz'min, Phys. Rev. Lett. 94, 107204 (2005). $T_c$ was found to be 770 K and 832 K for ASI and the thin film respectively. Fits to conventional Bloch law $M(T)=M(0)(1-T/T_c)^{3/2}$ yield unrealistically yield values of $T_c$. Nevertheless, it was found to be unlikely that the temperatures reached during CW exposure reach $T_c$. FIG. 17 b) shows hysteresis loops as a function of temperature from 120-380 K. Again, only a 10% drop in coercive field can be seen, giving further evidence to the high $T_c$ of the samples.

FIG. 17 b) shows magnetisation as a function of applied field for temperature ranging from 120 K to 380 K. The coercive field ($H_c$) decreases 11.2 mT during that temperature range.

Figure 18:
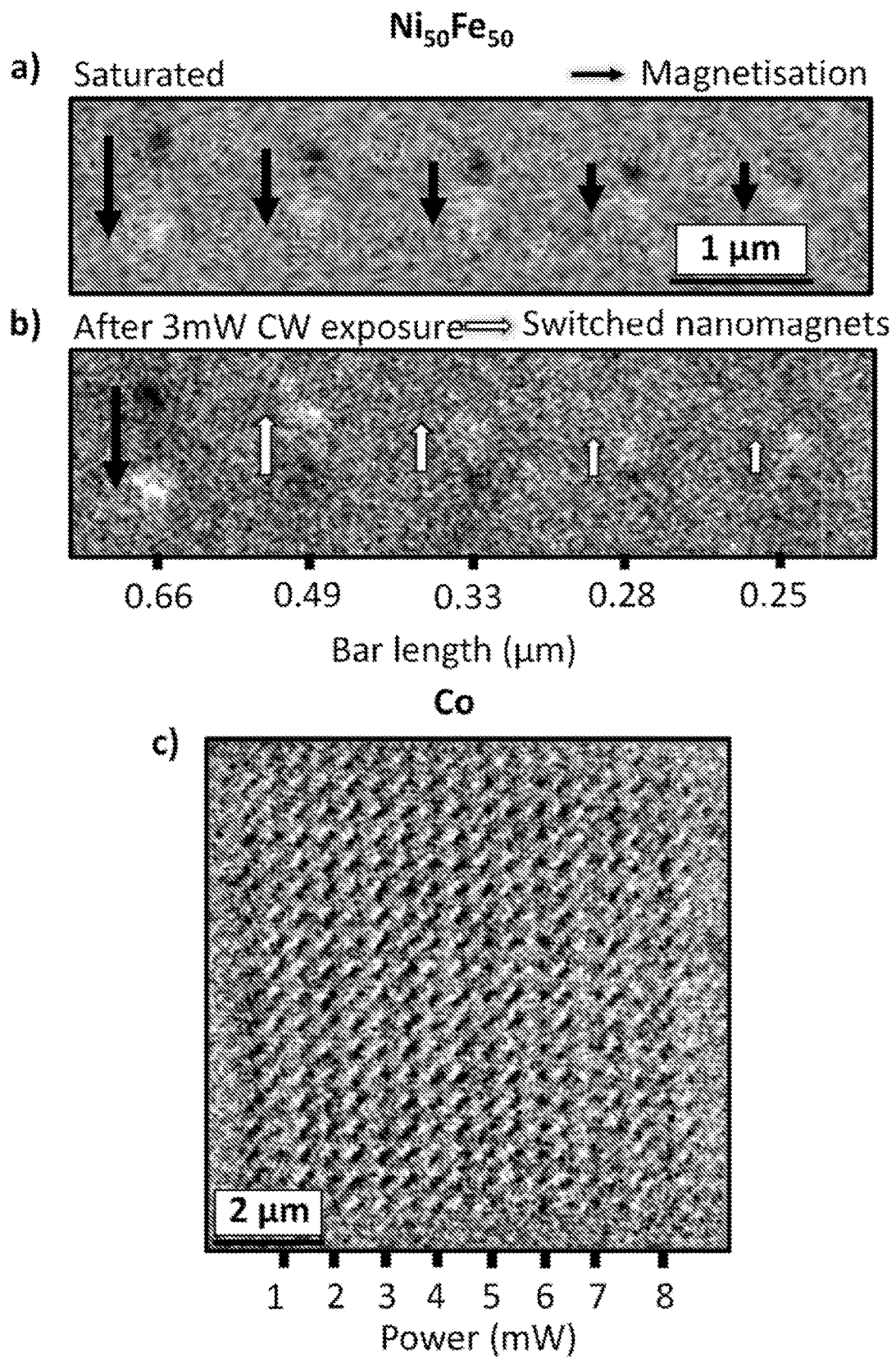
FIG. 18 shows experimental characterisations relating to exposing $Ni_{50}Fe_{50}$ and Co nanomagnetic arrays with an initial saturated state to illumination.

Referring also to FIG. 18, MFM images of $Ni_{50}Fe_{50}$ and Co nanomagnetic arrays are shown.

FIG. 18 shows writing of a,b) $Ni_{50}Fe_{50}$ nanostructures after exposure to a λ=633 nm laser with 3 mW power and c) attempted writing of a Co nanostructures after exposure to a λ=633 nm laser with powers ranging from 1-8 mW. The nanostructures were patterned on an $Au/SiO_2$ substrate. Polarisation was parallel to the bar long axis. $Ni_{50}Fe_{50}$ possesses the necessary band structure for OISTR to take effect whereas Co does not. $Ni_{50}Fe_{50}$ nanowires with length 490 nm were switched at 3 mW power. This was a lower power and broader dimension set than observed in permalloy. Conversely, no switches were observed in Co for powers up to 8 mW (displayed) and 30 mW (not shown). These results indicate that the multi-species nature of NiFe alloys which allow for the necessary band structure plays a role in the observed switching. Here a low moment MFM tip was used for imaging to avoid MFM-tip writing.

Figure 19:
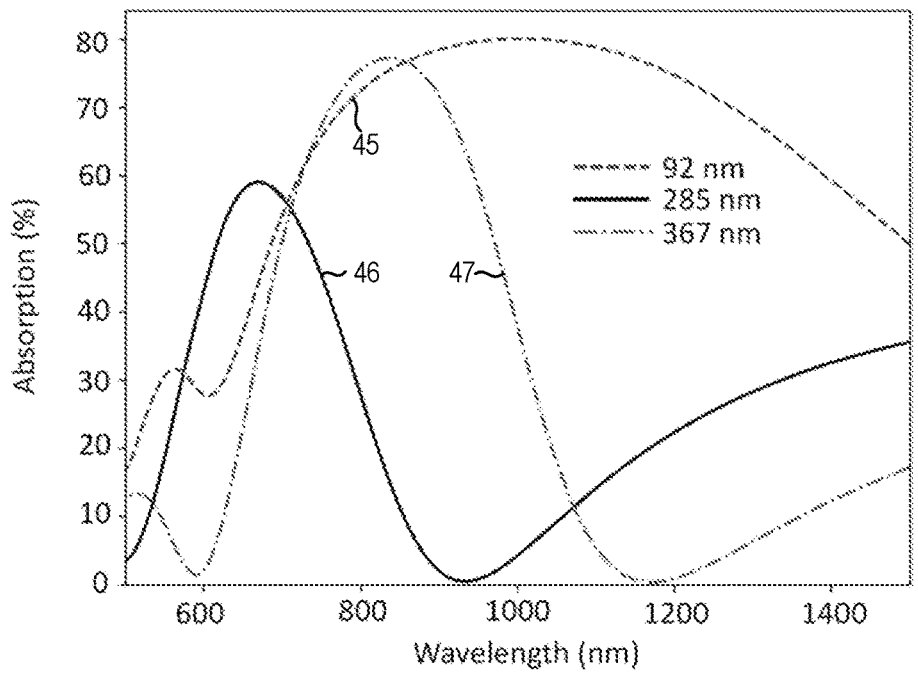
FIG. 19 shows experimental characterisations relating to absorption in permalloy nanomagnets disposed on a Au/SiO$_2$ substrate with varying SiO$_2$ thickness (t).

Referring also to FIG. 19, the absorption in the permalloy nanomagnets for an $Au/SiO_2$ substrate with varying $SiO_2$ thickness is shown.

It was found that by tuning t, the wavelength of absorption can be tuned. Here wavelength was tuned to 633 nm and 785 nm with t=285 nm (corresponding to series 46) and t=367 nm (corresponding to series 47) respectively. Furthermore, it was found that a broadband absorption response can be attained showing high absorption across a range of wavelengths using t=92 nm (corresponding to series 45).

Further Details

The linear optical response of the nano-structures was determined using the finite difference time domain (FDTD) technique (Lumerical FDTD). In these simulations, incident waves with different polarisations were applied to both individual structures and the periodic array. The simulations were simplified by including three layers of bar structures with rounded ends and a semi-infinite substrate. For single structure simulations, the absorption and extinction cross-sections were calculated by an analysis group of monitors located inside and outside of a total-field scattered-field source, respectively. A perfectly matched layer was applied in all directions to absorb incident light with minimal reflections. For array simulations, periodic boundary conditions were used in the plane of the substrate. In these simulations, the linear polarised waves of varying wavelength were incident from the air side. For the reflection calculation in FIG. 2a, the reflection spectrum of a gold mirror was normalised to.

Samples were fabricated via electron-beam lithography liftoff method on a Raith eLine system with a bilayer 495K/950K PMMA resist. Si substrates with a 300 nm $SiO_2$ layer were purchased commercially. The Au substrates were deposited on an $Si/SiO_2$ substrate with the following thicknesses (nm): Cr(2)/Al(250)/Cr(2)/$SiO_2$(290). Cr was used to aid Au adhesion. $Al_2O_3$, $Ni_{81}Fe_{19}$, $Ni_{50}Fe_{50}$ and Co were thermally evaporated at a base pressure of $2 \times 10^{-6}$ mbar. Magnetic force micrographs were produced on a Dimension 3100 using commercially available low-moment and normal-moment MFM tips.

Laser illumination by continuous-wave lasers with different wavelengths (633 nm and 785 nm) was focused to a diffraction limited spot on the sample through a confocal Raman microscope (alpha300 RSA+, WITec). The light was linearly polarized and focused by a ×100 (NA=0.9, Nikon) microscope objective. The focal spot was scanned to illuminate the locations of interest. To achieve the fastest line scanning speed, the instrument was simply scanned between two pre-defined points. For slower scans, 50 points were defined along each scan line and the detector integration time was used to control the dwell time. It should be noted that the integration time was usually used to control spectra collection, but here this parameter controls the illumination time. The power of the beam was measured by a power meter (PM100D, Thorlabs) attached to the objective turret.

Fourier transform infrared (FTIR) spectroscopy was used to characterise the linear optical response of the nanomagnetic particle arrays. The spectra were collected with a Bruker Hyperion 2000 FTIR microscope installed with a 15×, NA=0.4 metallic reflective objective. The reflection spectra were obtained by normalising the reflection curve from areas containing arrays and the neighbouring bare substrate against a reference spectrum taken from a gold mirror. Spectra were obtained in the range 500 nm to 1200 nm using a silicon detector.

Asymmetric Absorption

A role can be played by the location of a laser spot relative to each nanomagnet.

Referring to FIGS. 20A, 20B, 20C, 20D, 20E, 20F, and 20G, experimental characterisations and simulation data relating to enhanced asymmetric absorption in a nanomagnet array are shown.

Figure 20A:
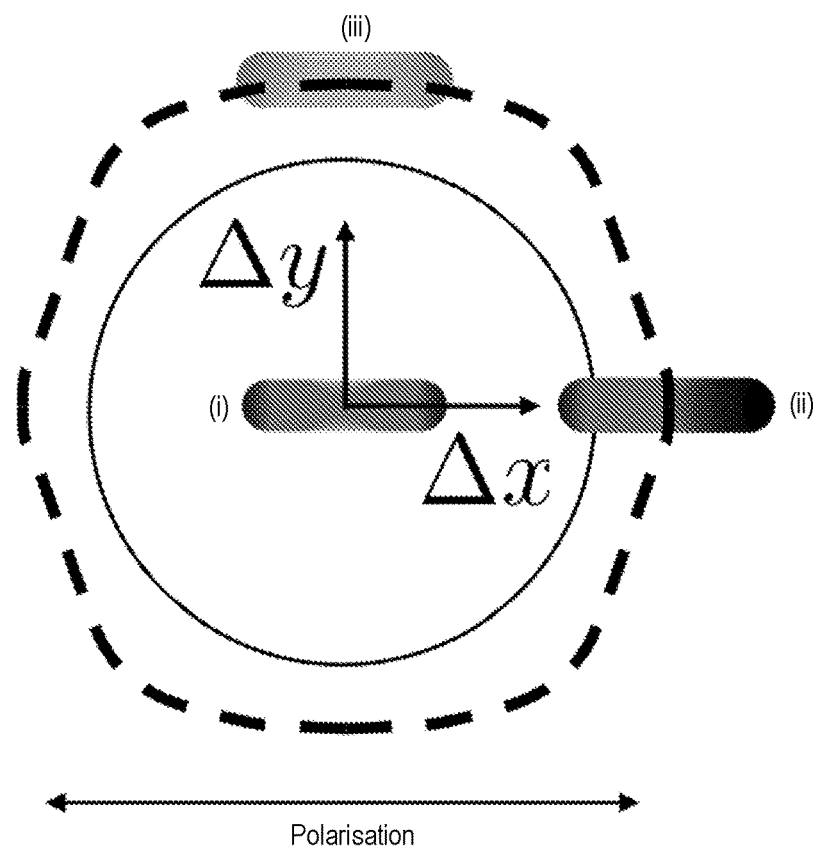
FIGS. 20A, 20B, 20C, 20D, 20E, 20F, and 20G show experimental characterisations and simulation data relating to enhanced asymmetric absorption in a nanomagnet array.

The absorption A $(\Delta x, \Delta y)$ was computed for light in a permalloy layer of a nanomagnet in a Gaussian beam where $\Delta x$ and $\Delta y$ are displacements relative to a fixed beam:

FIG. 20A shows a simulation schematic whereby a nanomagnet is shifted relative to a central Gaussian beam with a diameter of 580 nm. The Gaussian beam was modelled with a waist diameter of 580 nm at the sample, which matched experimental conditions.

Figure 20B:
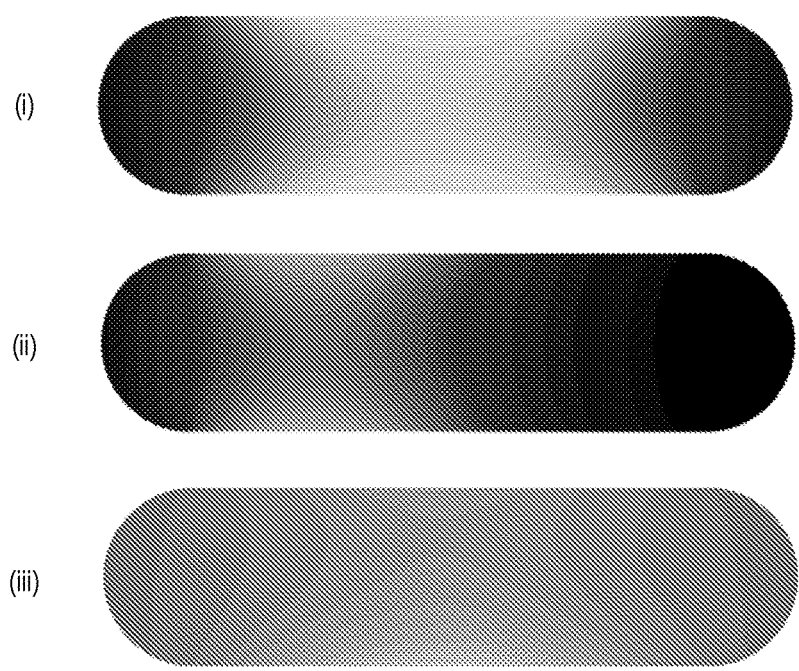

The absorption in four quadrants of the nanomagnet was computed to evaluate the degree of absorption asymmetry $\Delta A(\Delta x, \Delta y)$:

FIG. 20B shows the absorption profiles for the three nanomagnet positions (i), (ii), and (iii) labelled in FIG. 20A. For the central nanomagnet position (i), the absorption was found to be localised in the centre of the nanomagnet. As the nanomagnet was shifted (ii, iii), the absorption profile was found to become asymmetric. In other words, asymmetric absorption profiles were observed when the beam was off-centre. Without wishing to be bound by theory, it is believed that this can provide a driving force for magnetic reversal.

Figure 20C:
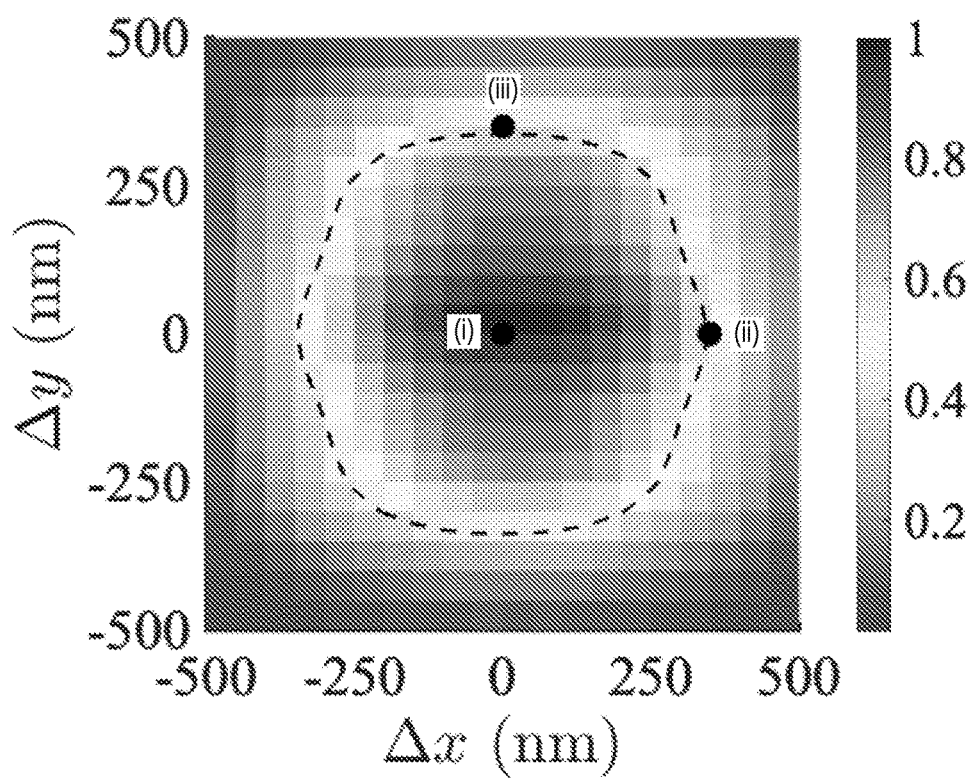
Figure 20D:
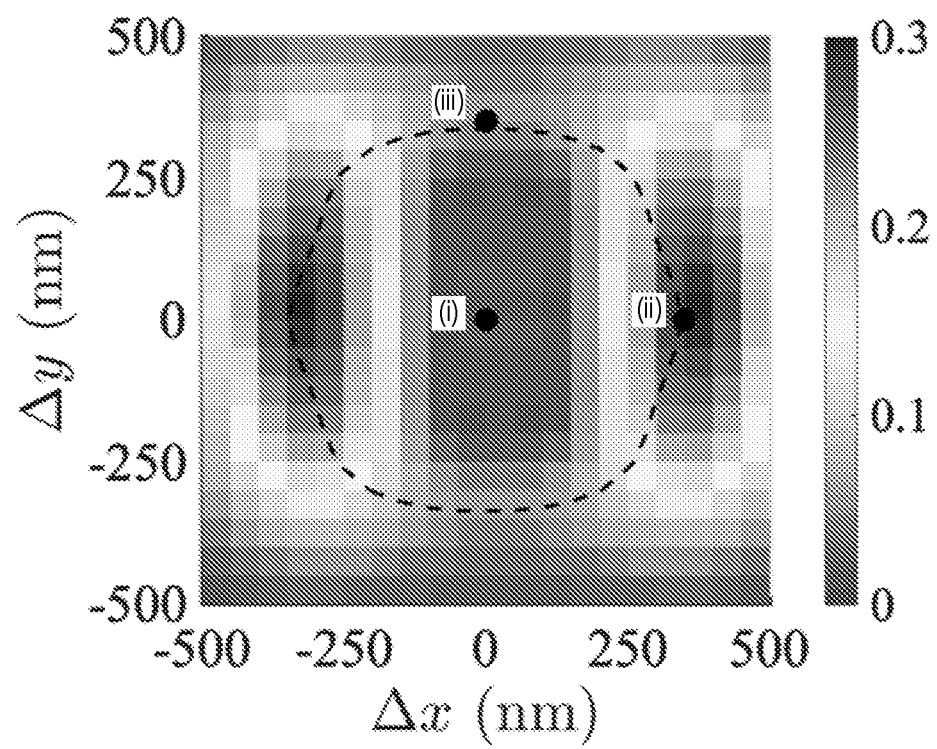

FIG. 20C shows simulated normalised absorption and FIG. 20D shows absorption asymmetry factor $\Delta A(\Delta x, \Delta y)$ for varying shifts, $\Delta x$ and $\Delta y$. The data shown in FIGS. 20C and 20D were normalised to the peak absorption $A(0,0)$. The dashed line indicates 50% total absorption. Nanomagnet dimensions of L=226 nm, W=78 nm and t=20 nm were used. Asymmetric absorption was found to be a strong effect, with more than 50% of peak absorption occurring at peak asymmetry, which implies that one side of the nanomagnet absorbs around 4 times more than the other side. The asymmetric absorption was found to grow for larger displacements, but with diminishing total absorption. Thus, the effect of asymmetry was found to be strongest within the illustrated dotted line boundaries of FIGS. 20C and 20D, where the absorption was >50% of the peak value. The shape of the absorption profile indicated in FIGS. 20C and 20D with a dashed line is a convolution between the circular beam and bar-shaped nanomagnet.

Figures 20E, 20F:
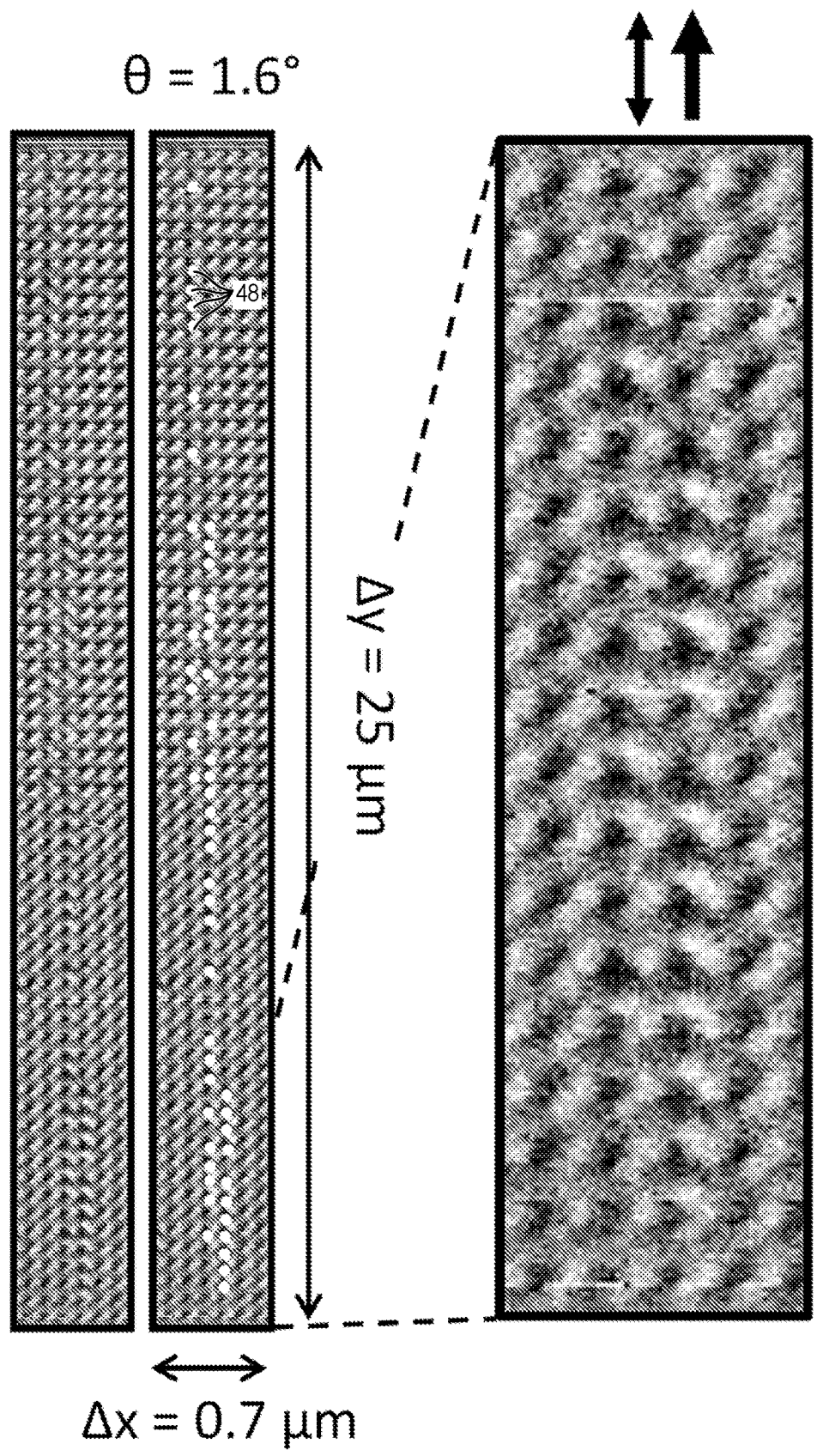

When applied to ASI arrays, nanomagnet switching was found to be affected by the relative angle between polarisation of the nanomagnets and a scan direction in which the light spot was moved:

FIG. 20E shows an MFM image, raw (left) and annotated to highlight reversal (right) after scanning a laser along an ASI array, of a chain of reversals resulting from scanning the laser beam 0.7 μm in x and 25 μm in y, with an angular offset of 1.6°. The polarisation of the illumination was aligned in ŷ. The annotated white dots 48 indicate reversed nanomagnets.

Two regions of single and double line switches were observed. Two regions of double-column switching were observed with lengths of 3.2 μm and 5.2 μm in y. In other words, at a 1.6° angle, the two regions of double switching lasted for 3.2 μm and 5.2 μm in the y direction during which the beam moved 90 and 140 nm in x. This gave an active region of 476±30 nm within which nanomagnets could switch.

Figure 20G:
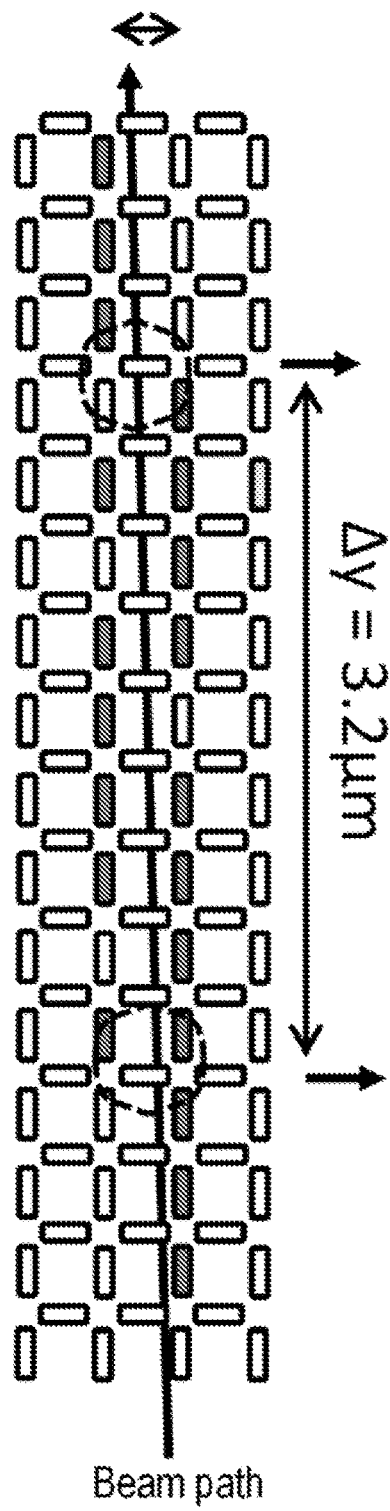
Figure 20G:
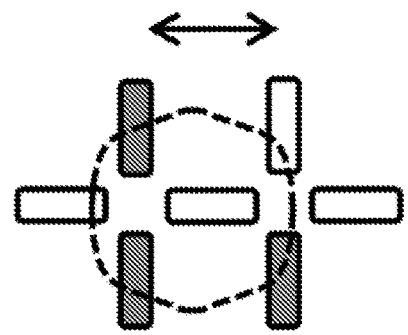
Figure 20G:
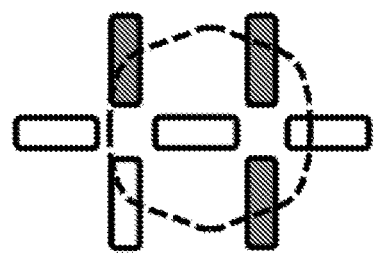

FIG. 20F shows an enlarged portion of the MFM image shown in FIG. 20E, and FIG. 20G shows a schematic of region in with two columns of switched nanomagnets (switched nanomagnets indicated with shading).

From the angular offset, it may be deduced that the beam traversed 90 nm and 140 nm in x respectively during these regions. From this, the diameter D of the active region of the beam was approximated using $D=\Delta x+P$ where P is the period of the ASI array. This gave an active region of D=476±30 nm, slightly smaller than the simulated region of 50% absorption in FIG. 20C. It may be observed that when scanning parallel to the polarisation and bar long-axis, a single line of nanomagnets can be switched as D<2P meaning only one column of bars is illuminated. This effect is consistently observed throughout FIG. 12. Referring also to FIG. 12, panels a and d to f show that parallel polarisation and scan direction were found to give rise to long chains of switches where subsequent switches share a common vertex. However, as shown in FIG. 12 panel b, when the scan direction was perpendicular to the polarisation, multiple columns of nanomagnets were seen to switch about 20% of the time. Without wishing to be bound by theory, this is believed to be attributable to the structure of the asymmetric absorption profile shown in FIG. 20D.

While the two regions of asymmetry moved one after the other for scan direction and polarisation aligned, they moved side-by-side for the perpendicular case. The broader reach of the asymmetry in the latter case was consistent with the observation of multiple switched lines. Further evidence of the role played by the asymmetry was found in the switching fidelity when scanning parallel to the polarisation. In this configuration, one end of the nanomagnet was preferentially excited, maximising asymmetry. Surprisingly, consistently higher writing fidelity was observed in this mode of operation. As such, there is evidence that the asymmetric absorption provides a driving force for reversal.

A result of the asymmetric absorption is the presence of a temperature gradient across the length of the nanomagnet, during the initial stages of excitation, which can facilitate the flow of magnons, spin currents, and domain walls. Reference is made to J. Xiao et al., Phys. Rev. B 81, 214418 (2010) and M. T. Islam, X. S. Wang, and X. R. Wang, J. Physics: Condens. Matter 31, 455701 (2019).

The observation that scanning the light spot parallel or perpendicular to the polarisation strongly influences switching fidelity (equivalently, probability) may be used in a magnetic medium for data storage. For example, ensuring that scan direction(s) used for writing to a magnetic medium are aligned to polarisations of ferromagnetic domains to maximise writing fidelity.

The difference in switching fidelity (probability) between scanning parallel/perpendicular to polarisation may also be harnessed to increase a density of storing information. For example, in an ASI array as shown in FIG. 12, a first set of bits may be defined based on regions each including a first number $N_1$ of first nanomagnets oriented in a first direction. The value would correspond to, for example the average polarisation of the $N_1$ first nanomagnets defining each first bit. Such bits may be switched by scanning a light spot parallel to the first direction, causing the first nanomagnets to switch with high fidelity. Meanwhile, second nanomagnets oriented in a second direction different (e.g., perpendicular) to the first direction would have a much lower probability of switching. A second set of bits may be defined based on regions each including a second number $N_2$ of second nanomagnets. The second bits may be switched by scanning the light spot in the second direction. The numbers $N_1$, $N_2$ may be selected based on the parallel and perpendicular switching probabilities, such that a first bit intersecting a second bit may be switched several times without disturbing the value (average polarisation) of the overlapping second bit (and vice versa). The more divergent the switching probabilities of first and second nanomagnets can be made, and in particular, the lower the switching probability for scanning perpendicular to the respective nanomagnet, the lower the numbers $N_1$, $N_2$ needed per first/second bit for such a multiplexed storage configuration. In some cases, for example when nanomagnets are structured to increase a barrier for switching, it may be possible for switching of nanomagnets perpendicular to the scan direction to be entirely suppressed (at an operating temperature), such that $N_1=N_2=1$.

Modifications

It will be appreciated that various modifications may be made to the embodiments hereinbefore described. Such modifications may involve equivalent and other features which are already known in the design and use of magnetic media, and which may be used instead of or in addition to features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A magnetic medium comprising:
   a thin film magnet structure formed of a ferromagnetic alloy or compound; and
   one or more optical structures, each optical structure comprising a dielectric layer having an upper surface and a lower surface, the dielectric layer interposed between the thin film magnet structure and a substrate having a reflective portion with the lower surface facing the reflective portion;
   wherein the thin film magnet structure comprises one or more ferromagnetic domains and is coupled to the one or more optical structures, each of the one or more ferromagnetic domains having a magnetization that is switchable between two or more states;
   wherein each of the one or more optical structures is configured to increase absorbance of light at a target wavelength in the thin film magnet structure, said configuration comprising that the corresponding dielectric layer is substantially transparent at a target wavelength, and has a thickness such that light at the target wavelength reflected from the lower surface interferes destructively with incident light at the target wavelength and light at the target wavelength reflected from the upper surface back towards the lower surface, such that in response to illumination of a ferromagnetic domain with continuous-wave light including the target wavelength, that ferromagnetic domain undergoes all-optical magnetic switching.

2. The magnetic medium of claim 1, wherein the optical structure is configured to increase absorbance of light in the thin film magnet structure at a target wavelength by acting as a Fabry-Pérot cavity.

3. The magnetic medium of claim 1, wherein the thin film magnet structure is coupled to a single optical structure.

4. The magnetic medium of claim 1, wherein the thin film magnet structure is coupled to two or more optical structures.

5. The magnetic medium of claim 1,
   wherein an optical structure of the one or more optical structures is configured to increase absorbance of the light in the thin film magnet structure at the target wavelength and at a second target wavelength;
   wherein a first ferromagnetic domain of the thin film magnet structure will undergo all-optical magnetic switching in response to illumination with continuous-wave light including the target wavelength; and
   wherein a second ferromagnetic domain of the thin film magnet structure will undergo all-optical magnetic switching in response to illumination with continuous-wave light including the second target wavelength.

6. The magnetic medium of claim 1, further comprising one or more second optical structures, wherein at least a portion of the thin film magnet structure is coupled to each of the second optical structures;
   wherein each of the one or more second optical structures is configured to increase absorbance of light in the thin film magnet structure at a second target wavelength;
   wherein a first ferromagnetic domain of the thin film magnet structure will undergo all-optical magnetic switching in response to illumination with continuous-wave light including the target wavelength; and
   wherein a second ferromagnetic domain of the thin film magnet structure will undergo all-optical magnetic switching in response to illumination with continuous-wave light including the second target wavelength.

7. The magnetic medium of claim 1, wherein the thin film magnet structure comprises one or more nanomagnets, and wherein each nanomagnet provides a respective ferromagnetic domain.

8. The magnetic medium of claim 1, wherein the ferromagnetic alloy or compound takes the form of an alloy comprising nickel and iron.

9. The magnetic medium of claim 1, wherein the thin film magnet structure comprises a first subset of the one or more ferromagnetic domains having a magnetization oriented substantially parallel to a first direction.

10. The magnetic medium of claim 9, wherein the thin film magnet structure comprises a second subset of the one or more ferromagnetic domains having a magnetization oriented substantially parallel to a second direction different from the first direction.

11. A system comprising:
    the magnetic medium of claim 1; and
    a source of continuous-wave light encompassing the target wavelength;
    wherein the system is configured to use the source of continuous-wave light to write information to the magnetic medium using all-optical magnetic switching of one or more ferromagnetic domains of the thin film magnet structure.

12. The system of claim 11, wherein the source of continuous-wave light is configured to apply a power density greater than or equal to 0.1 MW/cm$^2$, greater than or equal to 0.35 MW/cm$^2$, or greater than or equal to 1 MW/cm$^2$ to ferromagnetic domains of the magnetic medium.

13. The system of claim 11, wherein the source of continuous-wave light is configured to emit polarised light.

14. The system of claim 11,
    wherein the thin film magnet structure comprises a first subset of the one or more ferromagnetic domains having a magnetization oriented substantially parallel to a first direction, and
    wherein the system is configured to switch one or more ferromagnetic domains belonging to the first subset by scanning light from the source of continuous-wave light in a direction substantially parallel to the first direction.

15. The system of claim 14,
    wherein the thin film magnet structure further comprises a second subset of the one or more ferromagnetic domains having a magnetization oriented substantially parallel to a second direction different to the first direction, and wherein the system is configured to switch one or more ferromagnetic domains belonging to the second subset by scanning light from the source of continuous-wave light in a direction substantially parallel to the second direction.

16. The system of claim 11, configured to pulse or modulate illumination provided by the source of continuous-wave light.

17. A system configured to receive a magnetic medium according to claim 1, and comprising a source of continuous-wave light encompassing the target wavelength;

wherein the system is configured to use the source of continuous-wave light to write information to the magnetic medium using all-optical magnetic switching of one or more ferromagnetic domains of the thin film magnet structure.

18. A method of writing information to a magnetic medium, the magnetic medium comprising:

a thin film magnet structure formed of a ferromagnetic alloy or compound; and one or more optical structures, each optical structure comprising a dielectric layer having an upper surface and a lower surface, the dielectric layer interposed between the thin film magnet structure and a substrate having a reflective portion with the lower surface facing the reflective portion;

wherein the thin film magnet structure comprises one or more ferromagnetic domains and is coupled to the one or more optical structures, each of the one or more ferromagnetic domains having a magnetization that is switchable between two or more states, wherein each of the one or more optical structures is configured to increase absorbance of light at a target wavelength in the thin film magnet structure, configuration comprising that the corresponding dielectric layer is substantially transparent at a target wavelength, and has a thickness such that light at the target wavelength reflected from the lower surface interferes destructively with incident light at the target wavelength and light at the target wavelength reflected from the upper surface back towards the lower surface;

the method comprising:

illuminating a ferromagnetic domain with continuous-wave light including a target wavelength to cause that ferromagnetic domain to undergo all-optical magnetic switching.

* * * * *